United States Patent
Ikarashi et al.

(10) Patent No.: US 11,515,998 B2
(45) Date of Patent: Nov. 29, 2022

(54) SECURE COMPUTATION DEVICE, SECURE COMPUTATION METHOD, PROGRAM, AND RECORDING MEDIUM

(71) Applicant: NIPPON TELEGRAPH AND TELEPHONE CORPORATION, Chiyoda-ku (JP)

(72) Inventors: Dai Ikarashi, Musashino (JP); Ryo Kikuchi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 303 days.

(21) Appl. No.: 16/638,987

(22) PCT Filed: Aug. 16, 2018

(86) PCT No.: PCT/JP2018/030440
§ 371 (c)(1),
(2) Date: Feb. 13, 2020

(87) PCT Pub. No.: WO2019/039381
PCT Pub. Date: Feb. 28, 2019

(65) Prior Publication Data
US 2020/0228314 A1    Jul. 16, 2020

(30) Foreign Application Priority Data
Aug. 22, 2017   (JP) .............................. JP2017-159344

(51) Int. Cl.
*A61C 9/00*    (2006.01)
*H04L 9/06*    (2006.01)

(52) U.S. Cl.
CPC ................................. *H04L 9/0631* (2013.01)

(58) Field of Classification Search
CPC . H04L 9/0631; H04L 2209/46; H04L 9/0637; G09C 1/00
See application file for complete search history.

(56) References Cited

U.S. PATENT DOCUMENTS

2013/0090132 A1*  4/2013  Terada ................. H04W 4/029
                                                       455/456.1
2016/0210472 A1   7/2016  Ikarashi et al.
(Continued)

FOREIGN PATENT DOCUMENTS

EP         2 947 642 A1     11/2015
WO    WO 2015/053184 A1     4/2015
WO    WO 2016/104476 A1     6/2016

OTHER PUBLICATIONS

International Search Report dated Nov. 20, 2018 in PCT/JP2018/030440 filed Aug. 16, 2018, 2 pages.

(Continued)

*Primary Examiner* — Abu S Sholeman
(74) *Attorney, Agent, or Firm* — Oblon, McClelland, Maier & Neustadt, L.L.P.

(57) ABSTRACT

A secure computation device obtains concealed information $\{M(i_0, \ldots, i_{S-1})\}$ of a table $M(i_0, \ldots, i_{S-1})$ having one-variable function values as its members. It is to be noted that $M(i_{b,0}, \ldots, i_{b,S-1})$ generated by substituting counter values $i_{b,0}, \ldots, i_{b,S-1}$ into the table $M(i_0, \ldots, i_{S-1})$ represents a matrix $M_{b,\gamma,\mu}$, which is any one of $M_{b,2,1}, \ldots, M_{b,3,2}$. The secure computation device obtains concealed information $\{M_{b,\gamma,\mu}\}$ by secure computation using concealed information $\{i_{b,0}\}, \ldots, \{i_{b,S-1}\}$ and the concealed information $\{M(i_0, \ldots, i_{S-1})\}$, and obtains concealed information $\{M_{b,\Gamma,MU}\}$ of a matrix $M_{b,\Gamma,MU}$, which is obtained by execution of a remaining process (Continued)

including those processes among a process $P_{j,1}$, a process $P_{j,2}$, a process $P_{j,3}$, and a process $P_{j,4}$, that are performed subsequent to a process $P_{\gamma,\mu}$.

12 Claims, 9 Drawing Sheets

(56) References Cited

U.S. PATENT DOCUMENTS

| | | | |
|---|---|---|---|
| 2016/0269175 A1* | 9/2016 | Cammarota | H04L 9/002 |
| 2016/0306973 A1* | 10/2016 | Bruekers | G06F 21/14 |
| 2017/0243041 A1* | 8/2017 | Arce | G06K 19/06056 |
| 2017/0365192 A1 | 12/2017 | Ikarashi | |
| 2018/0115538 A1* | 4/2018 | Blake | H04L 9/14 |
| 2018/0331820 A1* | 11/2018 | Rietman | H01L 23/5386 |

OTHER PUBLICATIONS

Bernstein et al., "New AES software speed records," Indocrypt 2008, Progress in Cryptology—Indocrypt 2008, 2008, pp. 1-15.

Information Security Measure Infrastructure Improving Project, "Implementation of Electronic Government Recommended Cipher," Information-technology Promotion Agency, Japan, 56 pages total (with partial English translation).

Chida et al., "A Three-Party Secure Function Evaluation with Lightweight Verifiability Revisited," CSS2010, 2010, 6 pages total.

Ben-Or et al., "Completeness Theorems for Non-Cryptographic Fault-Tolerant Distributed Computation (Extended Abstract)", STOC 1988, 1988, pp. 1-10.

Ikarashi et al., "Actively Private and Correct MPC Scheme in t < n/2 from Passively Secure Schemes with Small Overhead," Cryptology ePrint Archive, Report 2014/304, 2014, 18 pages total.

Ikarashi et al., "An Efficient SIMD Protocol against Malicious Adversaries for Secure Computation Schemes Based on (k, n) Secret Sharing Schemes with Small Party Sets," Proceedings of Computer Security Symposium 2013, Oct. 14, 2013, 8 pages total.

Damgard, I., et al., "Implementing AES via an Actively/Covertly Secure Dishonest-Majority MPC Protocol", Springer-Verlag, SCN 2012. LNCS 7485, 2012, pp. 241-263, XP47016102.

Cramer, R., et al., "Share Conversion, Pseudorandom Secret-Sharing and Applications to Secure Computation", Springer-Verlag, TCC 2005, LNCS 3378, pp. 342-362, XP47029379.

Herbst, C., et al., "An AES Smart Card Implementation Resistant to Power Analysis Attacks*", Springer-Verlag, ACNS 2006, LNCS 3989, pp. 239-252, XP47503379.

\* cited by examiner

SECURE COMPUTATION DEVICE, SECURE COMPUTATION METHOD, PROGRAM, AND RECORDING MEDIUM

TECHNICAL FIELD

The present invention relates to secure computation techniques for block cipher.

BACKGROUND ART

One of symmetric key cryptosystems is Advanced Encryption Standard (AES) (see Non-patent Literature 1, for instance) In the AES, encryption is carried out through round processing that repeats permutation of members, cyclic shifting of rows, linear summation of columns, and addition of round keys. A CTR mode is one of block cipher modes of operation that encrypt plaintext in units of blocks of a predetermined length. When the AES is implemented in the CTR mode, round processing takes place in each block and the resulting cipher text of a key of the block is added to the plaintext of that block.

PRIOR ART LITERATURE

Non-Patent Literature

Non-patent Literature 1: Daniel J. Bernstein, Peter Schwabe, "New AES software speed records," INDOCRYPT 2008, Progress in Cryptology—INDOCRYPT 2008 pp. 3.22-336.

SUMMARY OF THE INVENTION

Problems to be Solved by the Invention

An object of the present invention is to efficiently perform round processing that repeats permutation of members, cyclic shifting of rows, linear summation of columns, and addition of round keys by means of secure computation.

Means to solve the Problems

B is an integer equal to or greater than 1, R is an integer equal to or greater than 3, S is an integer equal to or greater than 2, $U=S^2$ holds, and is a finite field. $b=0, \ldots, B-1$ holds, $r=1, \ldots, R$ holds, $j=2, \ldots, R$ holds, and round processing in a first round includes a process $P_{1,4}$, the process $P_{1,4}$ including processing for obtaining a matrix $M_{b,1,4}$ by adding S counter values $i_{b,0}, \ldots, i_{b,S-1}$ to S members in one of columns of an S×S matrix that is formed from members of a round key $k_1 \in F^U$ of the first round, respectively. Round processing in a jth round includes a process $P_{j,1}$, a process $P_{j,2}$, a process $P_{j,3}$, and a process $P_{j,4}$, the process $P_{j,1}$ including processing for obtaining a matrix $M_{b,j,1}$ by permutation of members of a matrix $M_{b,j-1,4}$, the process $P_{j,2}$ including processing for obtaining a matrix $M_{b,j,2}$ by cyclically shifting members of the matrix $M_{b,j,1}$ on a per-row basis, the process $P_{j,3}$ including processing for obtaining a matrix $M_{b,j,3}$ which has linear sums of S members of each column of the matrix $M_{b,j,2}$ as the S members of that column, and the process $P_{j,4}$ including processing for obtaining a matrix $M_{b,j,4}$ by adding the respective members of a round key $k_j$ of the jth round to the respective members of the matrix $M_{b,j,3}$.

A secure computation device performs an early-stage process for obtaining concealed information $\{M(i_0, \ldots, i_{S-1})\}$ of a table $M(i_0, \ldots, i_{S-1})$ having one-variable function values for a variable $i=i_0, \ldots, i_{S-1}$ as its members, by secure computation using concealed information of any one of round keys $k_1, \ldots, k_3$. It is to be noted that $M(i_{b,0}, \ldots, i_{b,S-1})$ generated by substituting the counter values $i_{b,0}, \ldots, i_{b,S-1}$ into the table $M(i_0, \ldots, i_{S-1})$ represents a matrix $M_{b,\gamma,\mu}$, which is any one of $M_{b,2,1}, \ldots, M_{b,3,2}$. The secure computation device obtains concealed information $\{M_{b,\gamma,\mu}\}$ of the matrix $M_{b,\gamma,\mu}$ for $b=0, \ldots, B-1$ by secure computation using concealed information $\{i_{b,0}\}, \ldots, \{i_{b,S-1}\}$ of the counter values $i_{b,0}, \ldots, i_{b,S-1}$ and the concealed information $\{M(i_0, \ldots, i_{S-1})\}$, and performs a later-stage process for obtaining concealed information $\{M_{b,\Gamma,MU}\}$ of a matrix $M_{b,\Gamma,MU}$ which is obtained by execution of a remaining process, by secure computation using concealed information of any one of round keys $k_2, \ldots, k_{R+1}$ and the concealed information $\{M_{b,\gamma,\mu}\}$, where the remaining process includes those processes among the process $P_{j,1}$, the process $P_{j,2}$, the process $P_{j,3}$, and the process $P_{j,4}$ for $j=2, \ldots, R$ that are performed subsequent to a process $P_{\gamma,\mu}$.

EFFECTS OF THE INVENTION

The present invention can efficiently execute round processing that repeats permutation of members, cyclic shifting of rows, linear summation of columns, and addition of round keys by means of secure computation.

DETAILED DESCRIPTION OF THE EMBODIMENTS

Embodiments of the present invention are described below with reference to the drawings.

First embodiment

Figure 1:
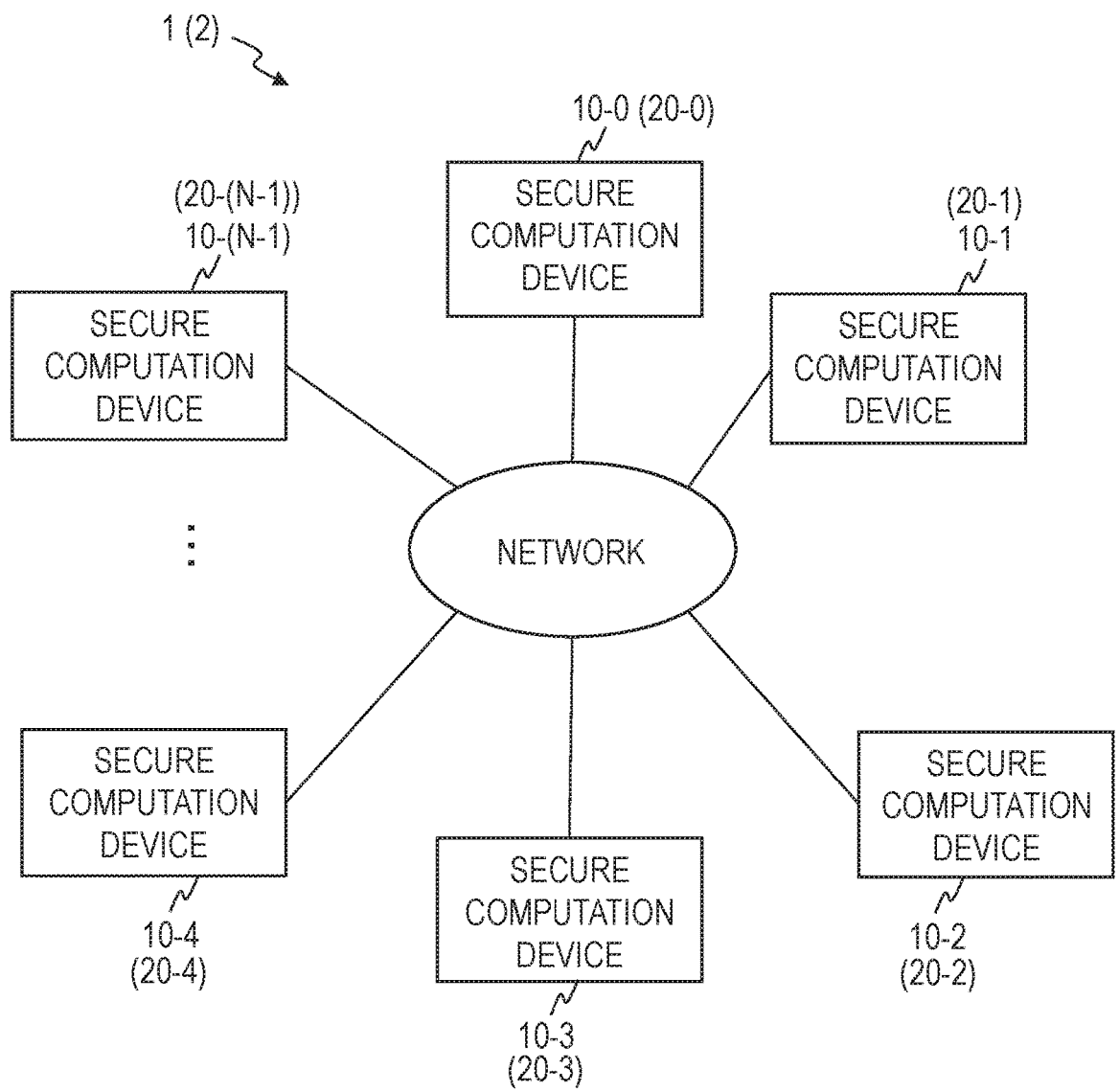
FIG. 1 is a block diagram illustrating a secure computation system according to embodiments.

A first embodiment is initially described.
<Configuration>
As illustrated in FIG. 1, a secure computation system 1 in the present embodiment includes N secure computation devices 10-0 to 10-(N−1). N is an integer equal to or greater than 1. For example, N≥2 holds when secure computation is performed using shares resulting from secret sharing, and N≥1 holds when secure computation is performed using homomorphic cipher text. When N≥2, the secure computation devices 10-0 to 10-(N−1) are configured to be capable of communication over a network.

Figure 2:
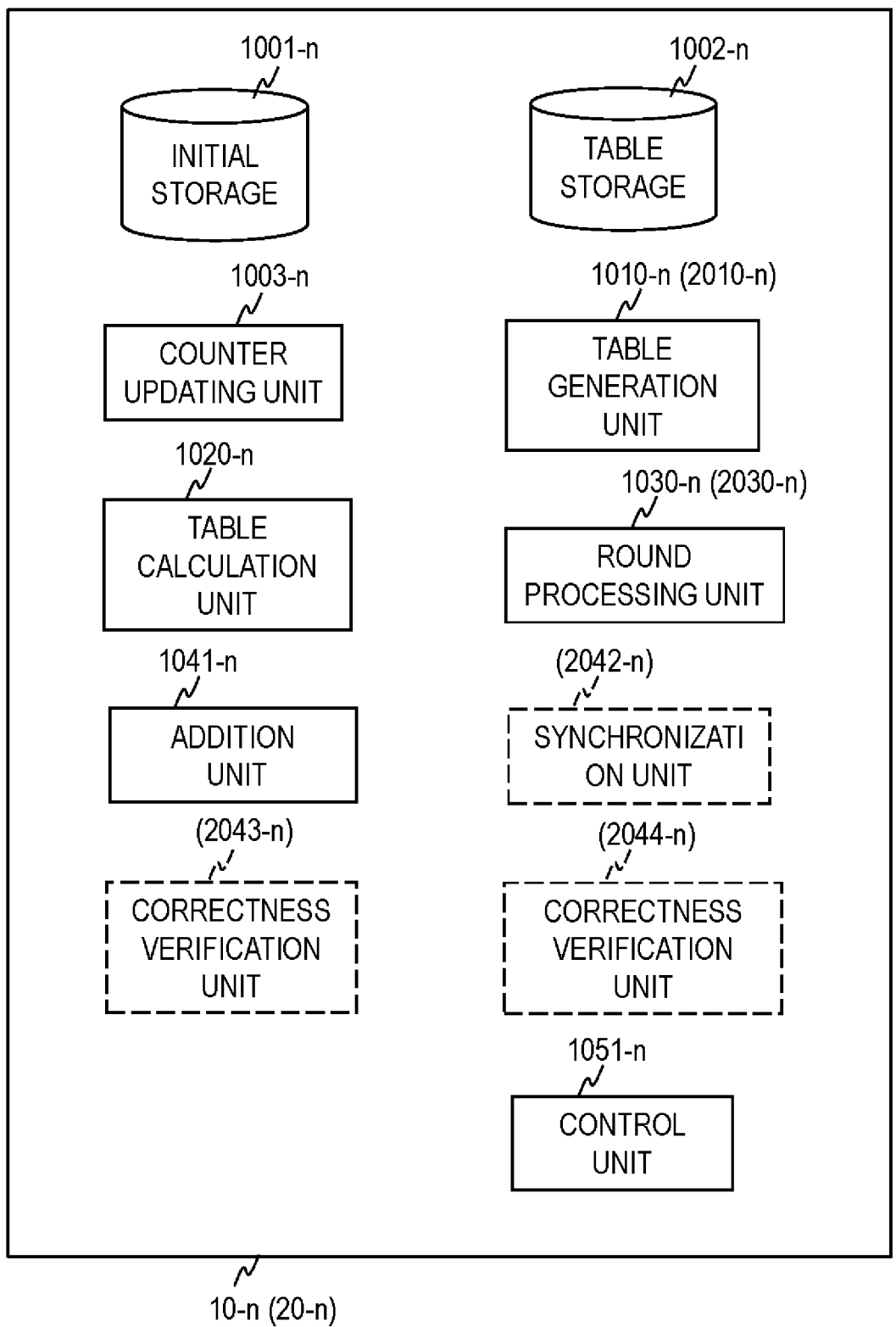
FIG. 2 is a block diagram illustrating a functional configuration of a secure computation device according to embodiments.

As illustrated in FIG. 2, a secure computation device 10-$n$ ($n$=0, . . . , N−1) in the present embodiment includes an initial storage 1001-$n$, a table storage 1002-$n$, a counter updating unit 1003-$n$, a table generation unit 1010-$n$, a table calculation unit 1020-$n$, a round processing unit 1030-$n$, an addition unit 1041-$n$, and a control unit 1051-$n$. The secure computation device 10-$n$ executes various kinds of processing under control of the control unit 1051-$n$. Data resulting from such processing is stored in a memory, not illustrated. The data stored in the memory is read from it as required for utilization in various kinds of processing.

Figure 3A:
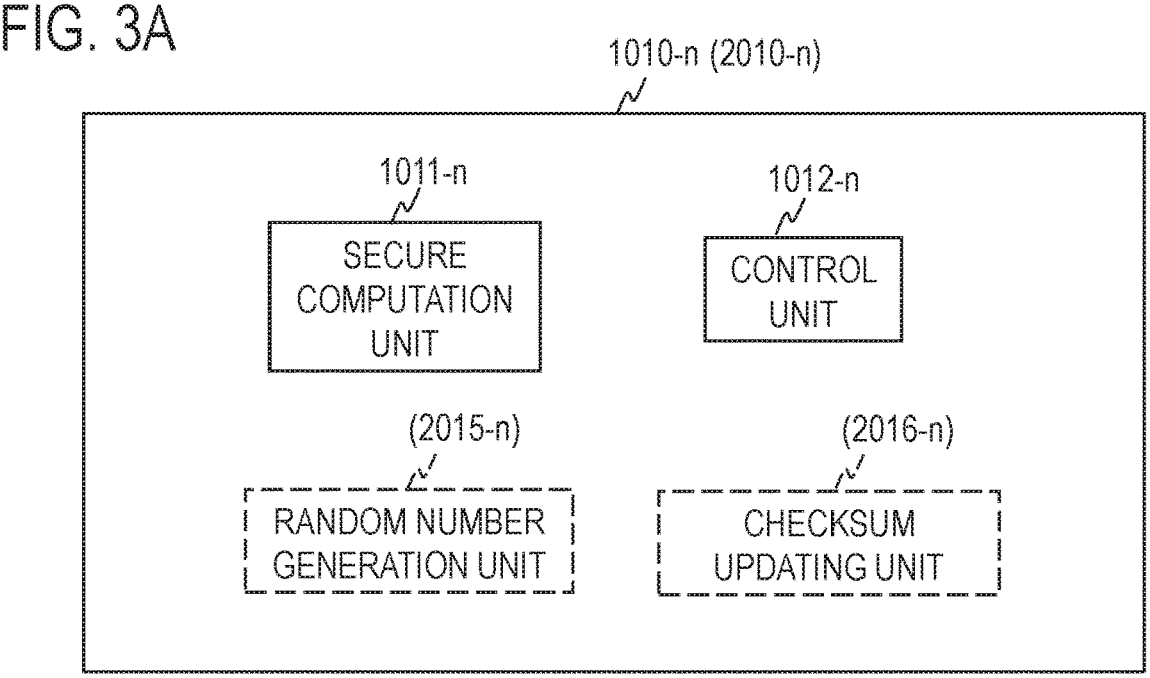
FIG. 3A is a block diagram illustrating a functional configuration of a table generation unit according to embodiments.
Figure 3B:
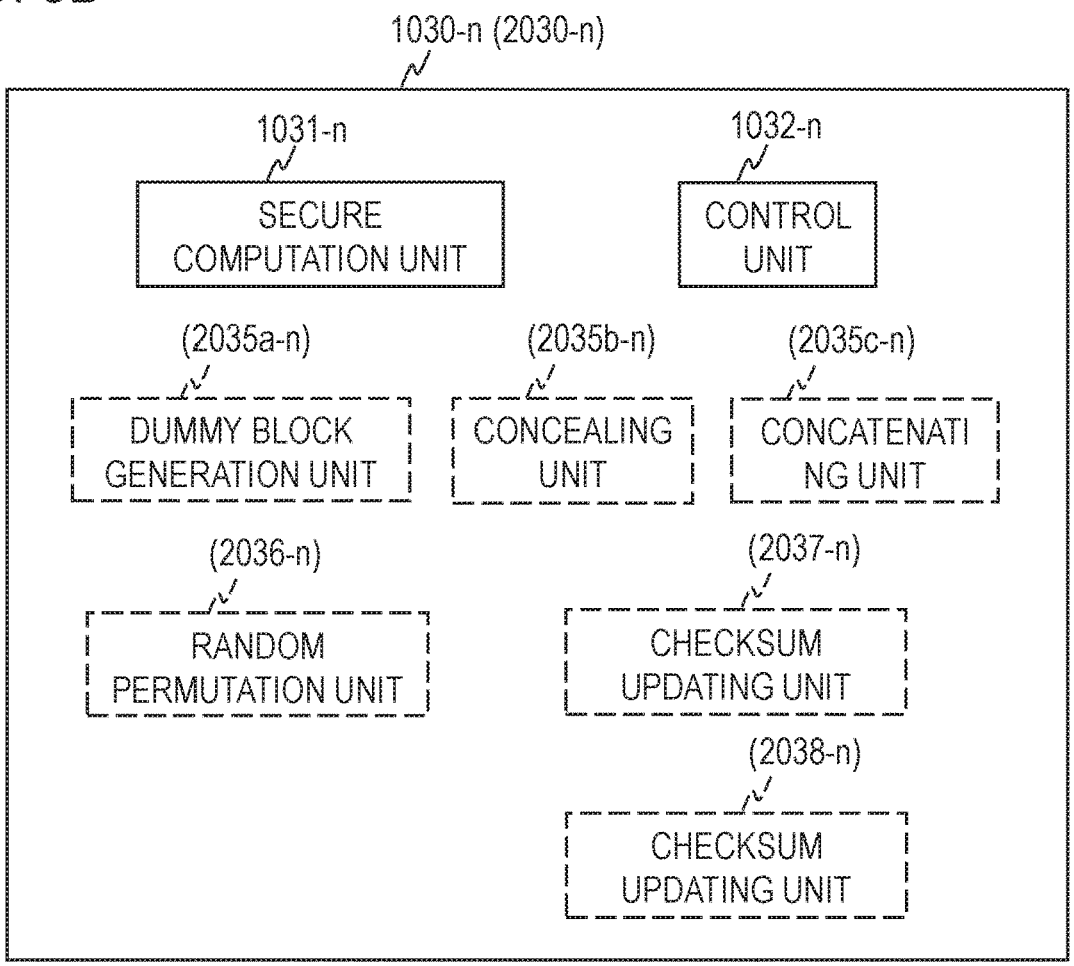
FIG. 3B is a block diagram illustrating a functional configuration of a round processing unit according to embodiments.

As illustrated in FIG. 3A, the table generation unit 1010-$n$ includes a secure computation unit 1011-$n$ and a control unit 1012-$n$. As illustrated in FIG. 3B, the round processing unit 1030-$n$ includes a secure computation unit 1031-$n$ and a control unit 1032-$n$.

<Overview of Processing>

Figure 4:
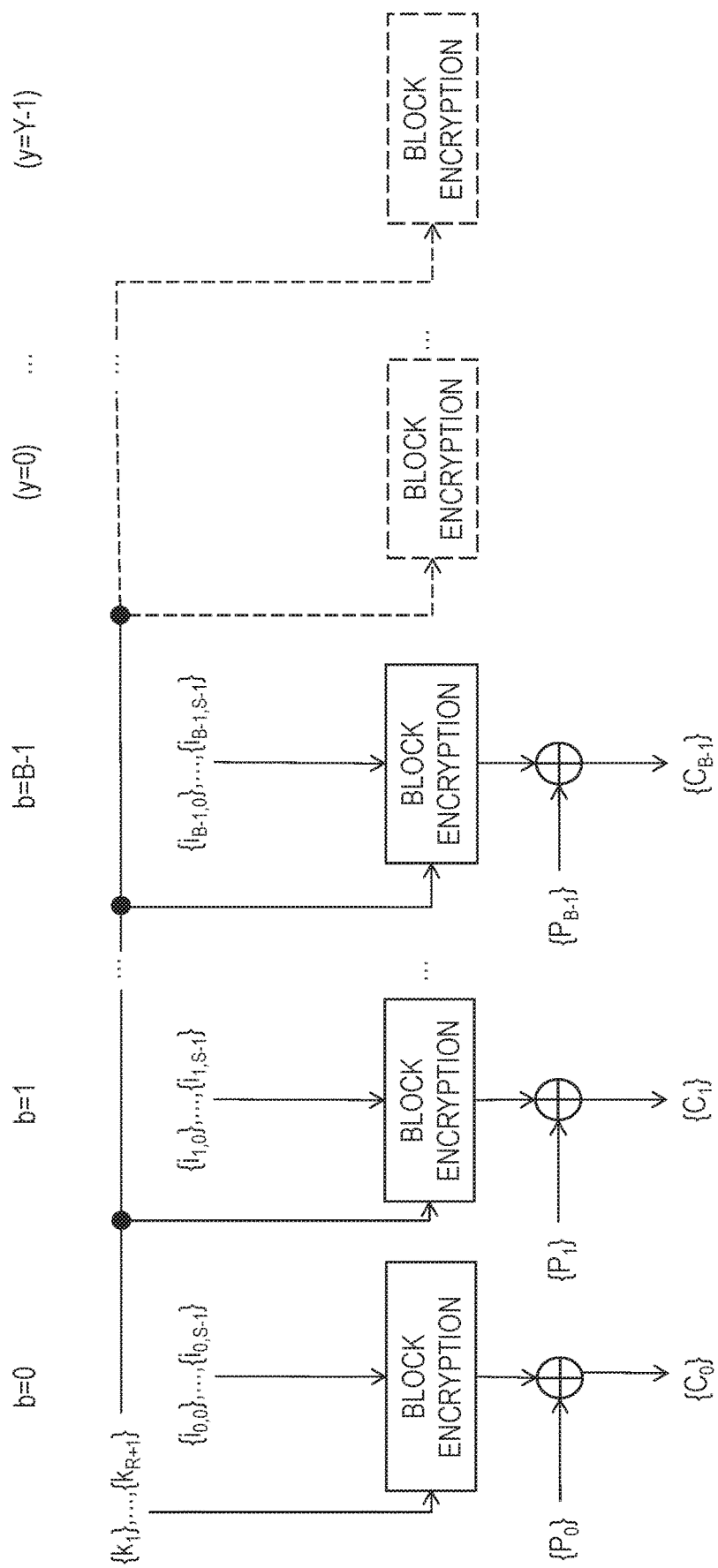
FIG. 4 is a conceptual diagram for describing overall processing according to an embodiment.
Figure 5:
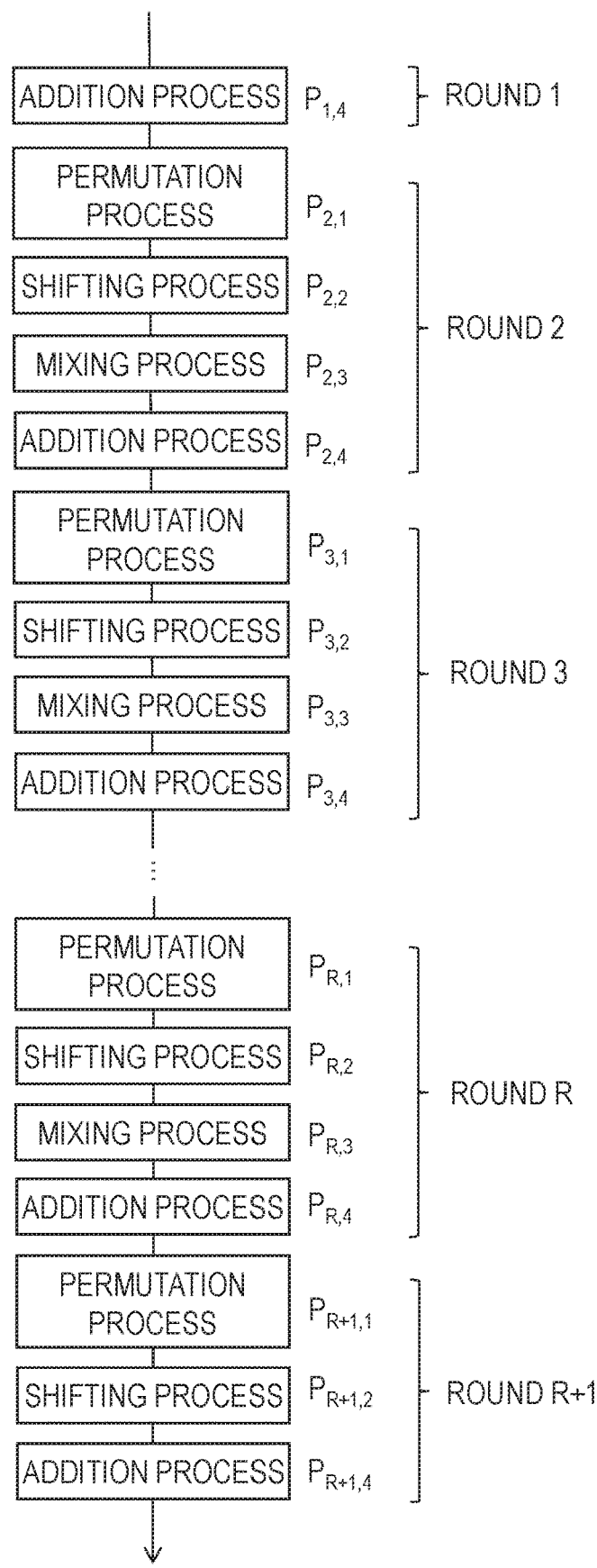
FIG. 5 is a conceptual diagram for describing typical block encryption.
Figure 6:
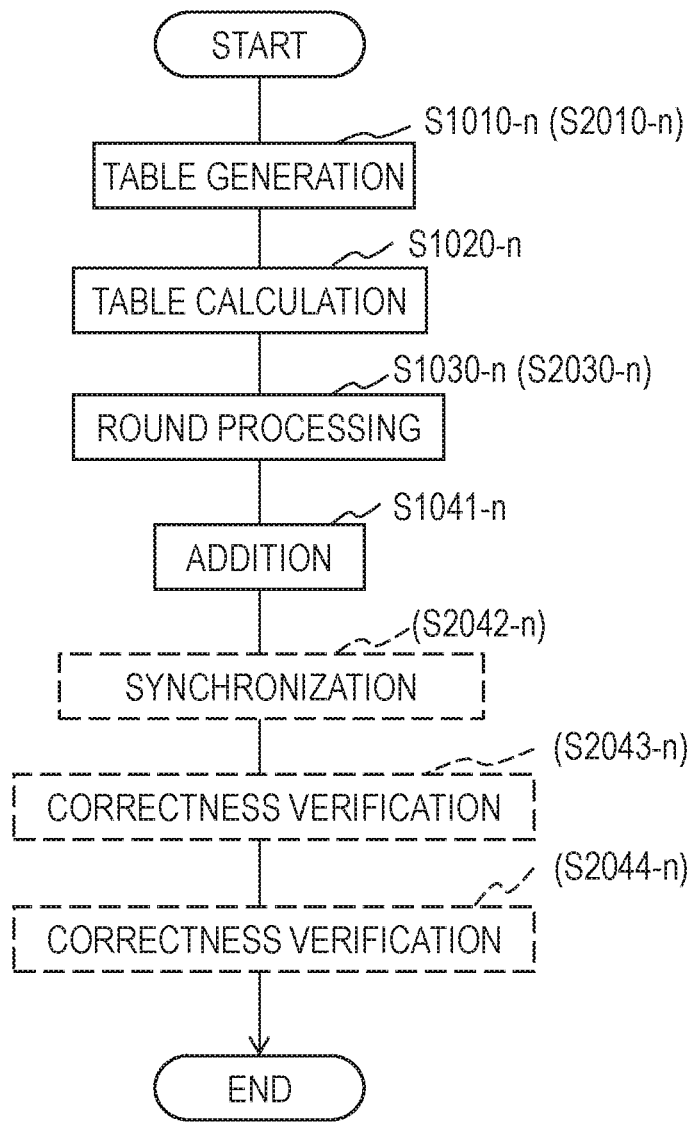
FIG. 6 is a flow diagram for describing an encryption process according to an embodiment.

As illustrated in FIGS. 4 and 5, the secure computation device 10-$n$ in the present embodiment performs block encryption in respective ones of blocks b=0, . . . , B−1, by secure computation using concealed information $\{k_1\}, \ldots, \{k_{R+1}\} \in \{F^U\}$ of round keys $k_1, \ldots, k_{R+1} \in F^U$ of the first, . . . , R+1th rounds and concealed information $\{i_{b,0}\}, \ldots, \{i_{b,S-1}\} \in \{F\}$ of counter values $i_{b,0}, \ldots, i_{b,S-1} \in F$ of the blocks b=0, . . . , B−1. Next, the secure computation device 10-$n$ performs addition (for example, exclusive OR), by secure computation, of concealed information resulting from the block encryption of the blocks b=0, . . . , B−1 and concealed information $\{P_0\}, \ldots, \{P_{B-1}\} \in \{F^U\}$ of plaintext blocks $P_0, \ldots, P_{B-1} \in F^U$, which have been generated by dividing plaintext P for encryption into B blocks. It is to be noted that B is an integer equal to or greater than 1, R is an integer equal to or greater than 3, S is an integer equal to or greater than 2, U=$S^2$ holds, and F is a finite field. An example of the finite field F is an extension field based on a basic field. An example of a basic field is a set of remainders modulo a prime number, where an operation result with the basic field is obtained as a remainder modulo the prime number. For example, F is an extension field GF($2^8$) generated by degree-8 extension of a basic field of order 2. For example, when the elements of a basic field are 2 bytes of data, the elements of extension field GF($2^8$) will be 1 byte(=8 bits) of data. In this case, 256 different values can be represented by the extension field GF($2^8$) $F^\alpha$ means a set vvhose members are the elements of $\alpha$ finite fields F. Also, $\alpha \in \beta$ means that a belongs to β. $\{\beta\}$ means a set to which concealed information $\{\alpha\}$ with $\alpha \in \beta$ belongs.

<<Block Encryption>>

The block encryption in the present embodiment uses a table to streamline a typical block encryption process. As illustrated in FIG. 5, a typical block encryption process involves round processing from rounds 1 to R+1. For example, block encryption process that implements the AES in the CTR mode would include processing from rounds 1 to 11 when a key length is 128 bits, processing from rounds 1 to 13 when the key length is 192 bits, and processing from rounds 1 to 15 when the key length is 256 bits.

The round processing in the first round includes an addition process $P_{1,4}$ (process $P_{1,4}$). The addition process $P_{1,4}$ includes processing for obtaining a matrix $M_{b,1,4}$ by adding S counter values $i_{b,0}, \ldots, i_{b,S-1}$ to S members in one of the columns of an S×S matrix that is formed from the members of a round key $k_1 \in F^U$ of the first round, respectively. In the case of the AES, the addition process $P_{1,4}$ corresponds to AddRoundKey in the first round.

The round processing in the jth round (j=2, . . . , R) includes a permutation process $P_{j,1}$ (process $P_{j,1}$) for performing permutation of members, a shifting process $P_{j,2}$ (process $P_{j,2}$) for performing cyclic shifting of rows, a mixing process $P_{j,3}$ (process $P_{j,3}$) for performing linear summation of columns, and an addition process $P_{j,4}$ (process $P_{j,4}$) for performing addition of round keys. In the case of the AES, the permutation process $P_{j,1}$ corresponds to SubBytes, the shifting process $P_{j,2}$ corresponds to ShiftRows, the mixing process $P_{j,3}$ corresponds to MixColumns, and the addition process $P_{j,4}$ corresponds to AddRoundKey. The permutation process $P_{j,1}$ includes processing for obtaining a matrix $M_{b,j,1}$ by permutation of the members of a matrix $M_{b,j-1,4}$. For example, the permutation process $P_{j,1}$ is a process that obtains the matrix $M_{b,j,1}$ by permutating the members of the matrix $M_{b,j-1,4}$ in accordance with a predefined procedure (for example, S-box). In the case of the AES, a multiplicative inverse element operation on the extension field GF($2^8$) with an irreducible polynomial $x^8+x^4+x^3+x+1$ is performed on the respective members of the matrix $M_{b,j-1,4}$, and affine transformation is further performed. With the result thereof, the members are permutated to obtain the matrix $M_{b,j,1}$ (Reference Literature 1: Information Security Measure Infrastructure Improving Project, "Implementation of Electronic Government Recommended Cipher", information-technology Promotion Agency, Japan). The shifting process $P_{j,2}$ includes processing for obtaining a matrix $M_{b,j,2}$ by cyclically shifting the members of the matrix $M_{b,j,1}$ on a per-row basis. For example, the shifting process $P_{j,2}$ is a process that cyclically shifts the τ+1th (τ=0, . . . , P−1) row of the matrix $M_{b,j,1}$ in a predetermined direction (for example, to the left) by τ members. The mixing process $P_{j,3}$ includes processing for obtaining a matrix $M_{b,j,3}$ which has the linear sums of S members of each column of the matrix $M_{b,j,2}$ as the S members of that column. A coefficient of each term of these linear sums differs from row to row. The addition process $P_{j,4}$ includes processing for obtaining the matrix $M_{b,j,4}$ by adding the respective members of the round key $k_j$ of the jth round to the respective members of the matrix $M_{b,j,3}$.

The round processing in the R+1th round includes a permutation process $P_{R+1,1}$ for performing permutation of members, a shifting process $P_{R+1,2}$ for performing cyclic shifting of rows, and an addition process $P_{R+1,4}$ for performing addition of round keys.

<<Block Encryption in the Present Embodiment>>

Features of the block encryption in the present embodiment are described. As mentioned above, the addition process $P_{1,4}$ in the first round obtains the matrix $M_{b,1,4}$ by adding the S counter values $i_{b,0}, \ldots, i_{b,S-1}$ respectively to the S members in one of the columns of an S×S matrix that is formed from the members of the round key $k_1$. When S=4, U=16, and in the round key $k_1=(k_{1,0}, \ldots, k_{1,15})$, the matrix $M_{b,1,4}$ will be, for example:

$$\begin{pmatrix} k_{1,0}+n_0 & k_{1,4}+n_4 & k_{1,8}+n_8 & k_{1,12}+i_{b,3} \\ k_{1,1}+n_1 & k_{1,5}+n_5 & k_{1,9}+n_9 & k_{1,13}+i_{b,2} \\ k_{1,2}+n_2 & k_{1,6}+n_6 & k_{1,10}+n_{10} & k_{1,14}+i_{b,1} \\ k_{1,3}+n_3 & k_{1,7}+n_7 & k_{1,11}+n_{11} & k_{1,15}+i_{b,0} \end{pmatrix} \quad (1)$$

where $n_0, \ldots, n_{11} \in F$ are arbitrary values. It is also possible that $n_0 = \ldots = n_{11} = 0$ holds. In the AES, $n_0, \ldots, n_{11}$ are equivalent to nonce.

The permutation process $P_{2,1}$ in the second round obtains the matrix $M_{b,j,1}$ by permutating the members of the matrix $M_{b,1,4}$ in accordance with a predefined procedure. This process is performed for each member of the matrix $M_{b,1,4}$. Thus, the permutation process of each member can be represented by function $f_s: F \to F$. When $S=4$, $U=16$, and the round key $k_1 = (k_{1,0}, \ldots, k_{1,15})$, the matrix $M_{b,2,1}$ will be:

$$\begin{pmatrix} f_s(k_{1,0}+n_0) & f_s(k_{1,4}+n_4) & f_s(k_{1,8}+n_8) & f_s(k_{1,12}+i_{b,3}) \\ f_s(k_{1,1}+n_1) & f_s(k_{1,5}+n_5) & f_s(k_{1,9}+n_9) & f_s(k_{1,13}+i_{b,2}) \\ f_s(k_{1,2}+n_2) & f_s(k_{1,6}+n_6) & f_s(k_{1,10}+n_{10}) & f_s(k_{1,14}+i_{b,1}) \\ f_s(k_{1,3}+n_3) & f_s(k_{1,7}+n_7) & f_s(k_{1,11}+n_{11}) & f_s(k_{1,15}+i_{b,0}) \end{pmatrix} \quad (2)$$

The round key $k_1$ and the arbitrary values $n_0, \ldots, n_{12}$ are common to all of the blocks $b=0, \ldots, B-1$ and can be regarded as constants. What differs among the blocks $b=0, \ldots, B-1$ is counter values $i_{b,0}, \ldots, i_{b,3}$. Assuming that the counter values $i_{b,0}, \ldots, i_{b,3}$ are variables $i_0, \ldots, i_3$ of a counter value, Formula (2) can be transformed as:

$$\begin{pmatrix} f_{1,0} & f_{1,4} & f_{1,8} & f_{1,12}(i_3) \\ f_{1,1} & f_{1,5} & f_{1,9} & f_{1,13}(i_2) \\ f_{1,2} & f_{1,6} & f_{1,10} & f_{1,14}(i_1) \\ f_{1,3} & f_{1,7} & f_{1,11} & f_{1,15}(i_0) \end{pmatrix} \quad (3)$$

where $f_{1,0}, \ldots, f_{1,11}$ can be regarded as constants because they are common to all of the blocks $b=0, \ldots, B-1$, while $f_{1,12}(i_3), \ldots, f_{1,15}(i_0)$ are one-variable function values for the variable $i=i_0, \ldots, i_3$. That is, the matrix $M_{b,2,1}$ of each block $b=0, \ldots, B-1$ can be generalized as a table $M(i_0, \ldots, i_3)$ having one-variable function values for the variable $i=i_0, \ldots, i_3$ as its members. This also applies to other values of S, in addition to when S=4. That is, the matrix $M_{b,2,1}$ of each block $b=0, \ldots, B-1$ can be generalized as a table having one-variable function values for a variable $i=i_0, \ldots, i_{S-1}$ as its members.

The shifting process $P_{2,2}$ in the second round is a process that obtains the matrix $M_{b,2,2}$ by cyclically shifting the members of the matrix $M_{b,2,1}$ on a per-row basis. Cyclically shifting the $\tau+1$th row of the matrix $M_{b,2,1}$ in Formula (3) to the left by $\tau$ members gives the matrix $M_{b,2,2}$ below:

$$\begin{pmatrix} f_{1,0} & f_{1,4} & f_{1,8} & f_{1,12}(i_3) \\ f_{1,5} & f_{1,9} & f_{1,13}(i_2) & f_{1,1} \\ f_{1,10} & f_{1,14}(i_1) & f_{1,2} & f_{1,6} \\ f_{1,15}(i_0) & f_{1,3} & f_{1,7} & f_{1,11} \end{pmatrix} \quad (4)$$

In this manner, the matrix $M_{b,2,2}$ of each block $b=0, \ldots, B-1$ can also be generalized as a table having one-variable function values for the variable $i=i_0, \ldots, i_{S-1}$ as its members.

The mixing process $P_{2,3}$ in the second round is a process that obtains the matrix $M_{b,2,3}$ which has the linear sums of the S members of each column of the matrix $M_{b,2,2}$ as the S members of that column. Performing the mixing process $P_{2,3}$ on the matrix $M_{b,2,2}$ in Formula (4) results in, for example:

$$\begin{pmatrix} 2x_0+3x_5+x_{10}+x_{15} & 2x_4+3x_9+x_{14}+x_3 & 2x_8+3x_{13}+x_2+x_7 & 2x_{12}+3x_1+x_6+x_{11} \\ x_0+2x_5+3x_{10}+x_{15} & x_4+2x_9+3x_{14}+x_3 & x_8+2x_{13}+3x_2+x_7 & x_{12}+2x_1+3x_6+x_{11} \\ x_0+x_5+2x_{10}+3x_{15} & x_4+x_9+2x_{14}+3x_3 & x_8+x_{13}+2x_2+3x_7 & x_{12}+x_1+2x_6+3x_{11} \\ 3x_0+x_5+x_{10}+2x_{15} & 3x_4+x_9+x_{14}+2x_3 & 3x_8+x_{13}+x_2+2x_7 & 3x_{12}+x_1+x_6+2x_{11} \end{pmatrix} \quad (5)$$

where $$\begin{pmatrix} x_0 & x_4 & x_8 & x_{12} \\ x_5 & x_9 & x_{13} & x_1 \\ x_{10} & x_{14} & x_2 & x_6 \\ x_{15} & x_3 & x_7 & x_{11} \end{pmatrix} = \begin{pmatrix} f_{1,0} & f_{1,4} & f_{1,8} & f_{1,12}(i_3) \\ f_{1,5} & f_{1,9} & f_{1,13}(i_2) & f_{1,1} \\ f_{1,10} & f_{1,14}(i_1) & f_{1,2} & f_{1,6} \\ f_{1,15}(i_0) & f_{1,3} & f_{1,7} & f_{1,11} \end{pmatrix} \quad (6)$$

$x_0, \ldots, x_{11}$ can be regarded as constants because they are common to all of the blocks $b=0, \ldots, B-1$, while $x_{12}, \ldots, x_{15}$ are one-variable function values for the variable $i=i_0, \ldots, i_{S-1}$. Accordingly, Formula (5) can be transformed as:

$$\begin{pmatrix} f_{2,0}(i_0) & f_{2,4}(i_1) & f_{2,8}(i_2) & f_{2,12}(i_3) \\ f_{2,1}(i_0) & f_{2,5}(i_1) & f_{2,9}(i_2) & f_{2,13}(i_3) \\ f_{2,2}(i_0) & f_{2,6}(i_1) & f_{2,10}(i_2) & f_{2,14}(i_3) \\ f_{2,3}(i_0) & f_{2,7}(i_1) & f_{2,11}(i_2) & f_{2,15}(i_3) \end{pmatrix} \quad (7)$$

where $f_{2,s}(i)$ ($s=0, \ldots, S-1$ and $i=i_0, \ldots, i_{S-1}$) is a one-variable function value. That is, the matrix $M_{b,2,3}$ can also be generalized as a table having one-variable function values for the variable $i=i_0, \ldots, i_{S-1}$ as its members.

The subsequent addition process $P_{2,4}$ in the second round and the permutation process $P_{3,1}$ in the third round are processes performed on a per-member basis. Accordingly, a matrix $M_{b,2,4}$ resulting from the addition process $P_{2,4}$ and a matrix $M_{b,3}$, resulting from the permutation process $P_{3,1}$ can also be generalized as tables having one-variable function values for the variable $i=i_0, \ldots, i_{S-1}$ as their members. Further, as the shifting process $P_{3,2}$ in the third round is merely cyclic shifting of the members, the resulting matrix $M_{b,3,2}$ can also be generalized as a table having one-variable function values for the variable $i=i_0, \ldots, i_{S-1}$ as its members. For example, the matrix $M_{b,3,2}$ will be:

$$\begin{pmatrix} f_{3,0}(i_0) & f_{3,4}(i_1) & f_{3,8}(i_2) & f_{3,12}(i_3) \\ f_{3,1}(i_1) & f_{3,5}(i_2) & f_{3,9}(i_3) & f_{3,13}(i_0) \\ f_{3,2}(i_2) & f_{3,6}(i_3) & f_{3,10}(i_0) & f_{3,14}(i_1) \\ f_{3,3}(i_3) & f_{3,7}(i_0) & f_{3,11}(i_1) & f_{3,15}(i_2) \end{pmatrix} \quad (8)$$

That is, the matrices $M_{b,2,1}, \ldots, M_{b,3,2}$ can be generalized as tables having one-variable function values for the variable $i=i_0, \ldots, i_{S-1}$ as their members. Here, substitution of the counter values $i_{b,0}, \ldots, i_{b,S-1}$ of each block b into a table $M(i_0, \ldots, i_{S-1})$ having one-variable function values for the variable $i=i_0, \ldots, i_{S-1}$ as its members gives the matrix $M(i_{b,0}, \ldots, i_{b,S-1})$ of that block b. The members of the table $M(i_0, \ldots, i_{S-1})$ can be regarded as one-variable function values or constants. Thus, each member of the table $M(i_0, \ldots, i_{S-1})$ can be represented by an amount of data equal to or smaller than that of the elements of the finite field F, and the entire table $M(i_0, \ldots, i_{S-1})$ can be represented by an amount of data equal to or smaller than U times the amount of data. For example, when S=4 and the finite field F is $GF(2^8)$ and the number of different values that can be assumed by the elements of the finite field F is 256, the number of different values that can be assumed by the members of the table $M(i_0, \ldots, i_{S-1})$ will be 256 or less, and the amount of data of the entire table will be 1 byte×256× 16=4096 bytes or less. Meanwhile, in the mixing process $P_{3,3}$ of the third round and onward, the resulting matrices cannot be represented as tables having one-variable function values for the variable $i=i_0, \ldots, i_{S-1}$. as their members (the resulting table would have multivariable function values as its members), leading to an increase in table size.

By making of these characteristics, the secure computation device 10-n first obtains concealed information $\{M(i_0, \ldots, i_{S-1})\}$ of the table $M(i_0, \ldots, i_{S-1})$ having one-variable function values for the variable $i=i_0, \ldots, i_{S-1}$ as its members, by secure computation using concealed information of any one of the round keys $k_1, \ldots, k_3$. It is to be noted that $M(i_{b,0}, \ldots, i_{b,S-1})$ generated by substituting the counter values $i_{b,0}, \ldots, i_{b,S-1}$ into the table $M(i_0, \ldots, i_{S-1})$ represents a matrix $M_{b,\gamma,\mu}$. The matrix $M_{b,\gamma,\mu}$ is any one of $M_{b,2,1}, \ldots, M_{b,3,2}$ ($\gamma=2, 3$ and $\mu=1, \ldots, 4$). Next, the secure computation device 10-n obtains concealed information $\{M_{b,\gamma,\mu}\}$ of the matrix $M_{b,\gamma,\mu}$ for $b=0, \ldots, B-1$ by secure computation using concealed information $\{i_{b,0}\}, \ldots, \{i_{b,S-1}\}$ of the counter values $i_{b,0}, \ldots, i_{b,S-1}$ and the concealed information $\{M(i_0, \ldots, i_{S-1})\}$. In this way, the concealed information $\{M_{b,\gamma,\mu}\}$ of the matrix $M_{b,\gamma,\mu}$ can be obtained with a low amount of computation. Particularly when the permutation process is carried out by secure computation, communications need to be performed among the secure computation devices 10-0 to 10-(N-1). Use of the concealed information $\{M(i_0, \ldots, i_{S-1})\}$ can reduce such communications. Particularly when $M_{b,\gamma,\mu}$ is $M_{b,3,1}$ or $M_{b,3,2}$, communications required for two processes $P_{2,1}$ and $P_{2,2}$ can be reduced. Given that the key length is 128 bits, such reduction is equivalent to 20%-reduction in the volume of communications traffic, enabling 25% higher speed.

The secure computation device 10-n then performs a later-stage process for obtaining concealed information $\{M_{b,\Gamma,MU}\}$ of a matrix $M_{b,\Gamma,MU}$ which is obtained by execution of a remaining process, by secure computation using concealed information of any one of the round keys $k_2, \ldots, k_{R+1}$ and the concealed information $\{M_{b,\gamma,\mu}\}$. The later-stage process includes those processes among the permutation process $P_{j,1}$, the shifting process $P_{j,2}$, the mixing process $P_{j,3}$, and the addition process $P_{j,4}$ for $j=2, \ldots, R$ that are performed subsequent to a process $P_{\gamma,\mu}$. For example, when $\Gamma=R+1$ and MU=4, the secure computation device 10-n obtains concealed information $\{M_{b,R+1,4}\}$ through the later-stage process and outputs it.

<Details of Processing>

With FIGS. 6 to 11 details of processing are described.

<<Presumption>>

As a presumption, assume that the initial storage 1001-n has stored therein concealed information $\{k_1\}, \ldots, \{k_{R+1}\}$ of the round keys $k_1, \ldots, k_{R+1}$, concealed information $\{i_{0,0}\}, \ldots, \{i_{0,S-1}\}$ of the counter values $i_{0,0}, \ldots, i_{0,S-1}$, and concealed information $\{P_0\}, \ldots, \{P_{B-1}\}$ of plaintext blocks $P_0, \ldots, P_{B-1}$. The concealed information may be shares (secret sharing values) in accordance with a secret sharing method or cipher text in accordance with a homomorphic cryptosystem (cipher text of the RSA cryptosystem or ElGamal cryptosystem). Methods of secure computation using concealed information in accordance with a secret sharing method are described in, for example, Koji Chida, Koki Hamada, Dai Ikarashi, and Katsumi Takahashi, "A Three-party Secure Function Evaluation with Lightweight Verifiability Revisited", CSS2010, 2010 (Reference Literature 2), and Michael Ben-Or, Shafi Goldwasser, Avi Wigderson, "Completeness Theorems for Non-Cryptographic Fault-Tolerant. Distributed Computation (Extended Abstract).", STOC 1988: 1-10 (Reference Literature 3).

<<Step S1010-n>>

The table generation unit 1010-n performs an early-stage process for obtaining concealed information $\{M(i_0, \ldots, i_{S-1})\}$ of the table $M(i_0, \ldots, i_{S-1})$ having one-variable function values for the variable $i=i_0, \ldots, i_{S-1}$ as its members, by secure computation using concealed information of any one of the round keys $k_1, \ldots, k_3$. It is to be noted that $M(i_{b,0}, \ldots, i_{b,S-1})$ generated by substituting the counter values $i_{b,0}, \ldots, i_{b,S-1}$ into the table $M(i_0, \ldots, i_{S-1})$ represents any one matrix $M_{b,\gamma,\mu}=M_{b,2,1}, \ldots, M_{b,3,2}$. That is, employing the counter values $i_{b,0}, \ldots, i_{b,S-1}$ as the variables $i_0, \ldots, i_{S-1}$ and under control of the control unit 1012-n, the secure computation unit 1011-n of the table generation unit 1010-n executes the addition process $P_{1,4}$ up to a certain process $P_{\gamma,\mu}$ ($P_{\gamma,\mu}$ is any one of $P_{2,1}, \ldots, P_{3,2}$) by secure computation (step S1011-n) using the concealed information of a necessary one of the round. keys $k_1, \ldots, k_R$, thus obtaining the concealed information $\{M(i_0, \ldots, i_{S-1})\}$. For example, when $M_{b,\gamma,\mu}=M_{b,2,1}$, the secure computation unit 1011-n of the table generation unit 1010-n executes the addition process $P_{1,4}$ of the first round and the permutation process $P_{2,1}$ of the second round by secure computation employing the counter values $i_{b,0}, \ldots, i_{b,S-1}$ as the variables $i_0, \ldots, i_{S-1}$ and using concealed information $\{k_1\}, \{k_2\}$, and obtains and outputs the concealed information of the matrix resulting from the permutation process P2, 1 as the concealed information $\{M(i_0, \ldots, i_{S-1})\}$ (for example, the concealed information with Formula (3)). For example, when $M_{b,\gamma,\mu}=M_{b,3,1}$, the secure computation unit 1011-n of the table generation unit 1010-n executes the addition process $P_{1,4}$ of the first round, the permutation process $P_{2,1}$, shifting process $P_{2,2}$, mixing process $P_{2,3}$, and addition process P2, 4 of the second round, and the permutation process $P_{3,1}$ of the third round by secure computation, employing the counter values $i_{b,0}, \ldots, i_{b,S-1}$ as the variables $i_0, \ldots, i_{S-1}$ and using concealed information $\{k_1\}, \{k_2\}, \{k_3\}$, and obtains and outputs concealed information of the matrix resulting from the permutation process $P_{3,1}$ as the concealed information $\{M(i_0, \ldots, i_{S-1})\}$. For example, when $M_{b,\gamma,\mu}=M_{b,3,2}$, the secure computation unit 1011-$n$ of the table generation unit 1010-$n$ executes the addition process $P_{1,\,4}$ of the first round, the permutation process $P_{2,\,1}$, shifting process $P_{2,\,2}$, mixing process $P_{2,\,3}$, and addition process $P_{2,\,4}$ of the second round, and the permutation process $P_{3,\,1}$ and shifting process $P_{3,\,2}$ of the third round by secure computation, employing the counter values $i_{b,\,0}, \ldots, i_{S-1}$ as the variables $i_0, \ldots, i_{S-1}$ and using concealed information $\{k_1\}$, $\{k_2\}$, $\{k_3\}$, and obtains and outputs concealed information of the matrix resulting from the shifting process $P_{3,\,2}$ as the concealed information $\{M(i_0, \ldots, i_{S-1})\}$ (for example, the concealed information with Formula (8)). The concealed information $\{M(i_0, \ldots, i_{S-1})\}$ is stored in the table storage 1002-$n$.

<<Step S1020-$n$>>

The counter updating unit 1003-$n$ obtains concealed information $\{i_{b',\,0}\}, \ldots, \{i_{b',\,S-1}\}$ of the counter values $i_{b',\,0}, \ldots, i_{b',\,S-1}$ of blocks $b'=2, \ldots, B-1$ by secure computation using the concealed information $\{i_{0,\,0}\}, \ldots, \{i_{0,\,S-1}\}$ of the counter values $i_{0,\,0}, \ldots, i_{0,\,S-1}$ stored in the initial storage 1001-$n$, and outputs it. The counter values $i_{b',\,0}, \ldots, i_{b',\,S-1}$ are values that are obtained by applying predefined rules to the counter values $i_{0,\,0}, \ldots, i_{0,\,S-1}$. For example, the counter values $i_{b',\,0}, \ldots, i_{b',\,S-1}$ are values that represent values $i_{b'-,\,0}, \ldots, i_{b'-1,\,S-1}+1$ which indicate values $i_{b'-1,\,0}, \ldots, i_{b'-1,\,S-1}$ represented by the counter values $i_{b'-,\,0}, \ldots, i_{b'-,\,S-1}$ as increased by a predetermined value (for example, 1). The table calculation unit 1020-$n$ obtains concealed information $\{M_{b,\,\gamma,\,\mu}\}=\{M(i_{b,\,0}, \ldots, i_{b,\,S-1})\}$ of the matrix $M_{b,\,\gamma,\,\mu}$ by secure computation for $b=0, \ldots, B-1$, using the concealed information $\{i_{b,\,0}\}, \ldots, \{i_{b,\,S-1}\}$ retrieved from the initial storage 1001-$n$ or output from the counter updating unit 1003-$n$ and the concealed information $\{M(i_0, \ldots, i_{S-1})\}$ retrieved from the table storage 1002-$n$, and then outputs it.

<<Step S1030-$n$>>

The round processing unit 1030-$n$ performs a later-stage process for obtaining concealed information $\{M_{b,\,\Gamma,\,MU}\}$ of the matrix $M_{b,\,\Gamma,\,MU}$ which is obtained by execution of a remaining process, by secure computation (step S1031$b$-$n$) using the concealed information of any one of round keys $k_2, \ldots, k_{R+1}$ and the concealed information $\{M_{b,\,\gamma,\,\mu}\}$. The remaining process is a process that includes those processes among the permutation process $P_{j,\,1}$, the shifting process $P_{j,\,2}$, the mixing process $P_{j,\,3}$, and the addition process $P_{j,\,4}$ for $j=2, \ldots, R$ that are performed subsequent to the process $P_{\gamma,\,\mu}$. The process $P_{\gamma,\,\mu}$ corresponds to the concealed information $\{M_{b,\,\gamma,\,\mu}\}=\{M(i_{b,\,0}, \ldots, i_{b,\,S-1})\}$ obtained by the table calculation unit 1020-$n$. For example, when $M_{b,\,\gamma,\,\mu}=M_{b,\,3,\,2}$ and $\Gamma=R+1$ and $MU=4$, the round processing unit 1030-$n$ obtains and outputs concealed information $\{M_{b,\,R+1,\,4}\}$ of a matrix $M_{b,\,R+1,\,4}$, which is obtained by executing the mixing process $P_{3,\,3}$ of the third round through the addition process $P_{R,\,4}$ of the Rth round, and further executing the permutation process $P_{R+1,\,1}$, shifting process $P_{R+1,\,2}$, and addition process $P_{R+1,\,4}$ of the R+1th round, by secure computation using concealed information $\{k_3\}, \ldots, \{k_{R+1}\}$ and concealed information $\{M_{b,\,3,\,2}\}$.

<<Step S1041-$n$>>

The addition unit 1041-$n$ takes, as input, the concealed information $\{M_{b,\,R+1,\,4}\}$ and concealed information $\{P_b\}$ for each block $b=0, \ldots, B-1$, obtains concealed information $\{C_b\}$ of $C_b=M_{b,\,R+1,\,4}+P_b \in F^U$ by secure computation, and outputs it.

<Features of the Present Embodiment>

As described above, the present embodiment generates the concealed information $\{M(i_0, \ldots, i_{S-1})\}$ of the table $M(i_0, \ldots, i_{S-1})$ and obtains concealed information $\{M_{b,\,\gamma,\,\mu}\}$ of each block $b=0, \ldots, B-1$ by secure computation using the concealed information $\{M(i_0, \ldots, i_{S-1})\}$. The size of the table $M(i_0, \ldots, i_{S-1})$ can be represented by an amount of data equal to or smaller than U times F, and the amount of computation can be reduced by performing the processing of each block $b=0, \ldots, B-1$ using the concealed information $\{M(i_0, \ldots, i_{S-1})\}$. Further, when $M_{b,\,\gamma,\,\mu}$ is $M_{b,\,3,\,1}$ or $M_{b,\,3,\,2}$, communications required for secure computation in the two processes $P_{2,\,1}$ and $P_{2,\,2}$ can be reduced. In this manner, the present embodiment can efficiently execute round processing that repeats permutation of members, cyclic shifting of rows, linear summation of columns, and addition of round keys by means of secure computation.

Second Embodiment

A second embodiment as a modification of the first embodiment generates checksums for falsification detection and performs falsification detection. It is to be noted that, as mentioned above, the amount of data processed in the early-stage process prior to obtaining, the concealed information $\{M(i_0, \ldots, i_{S-1})\}$ of the table $M(i_0, \ldots, i_{S-1})$ is small. In contrast, the amount of data processed in the later-stage process, performed after the early-stage process, is significantly greater. In accordance with this difference, the present embodiment generates checksums in different manners. This enables encryption to be performed securely and efficiently The following description focuses on differences from the first embodiment and simplifies description on what are already described by using the same reference characters.

<Configuration>

As illustrated in FIG. 1, a secure computation system 2 in the present embodiment includes N secure computation devices 20-0 to 20-(N−1). N is an integer equal to or greater than 1. When N≥2, the secure computation devices 20-0 to 20-(N−1) are configured to be capable of communication over a network.

As illustrated in FIG. 1, a secure computation device 20-$n$ ($n$=0, ..., N−1) in the present embodiment includes an initial storage 1001-$n$, a table storage 1002-$n$, a counter updating unit 1003-$n$, a table generation unit 2010-$n$, a table calculation unit 1020-$n$, a round processing unit 2030-$n$, an addition unit 1041-$n$, a synchronization unit 2042-$n$, a correctness verification units 2043-$n$, 2044-$n$, and a control unit 1051-$n$. The secure computation device 20-$n$ executes various kinds of processing under control of the control unit 1051-$n$. Data resulting from such processing is stored in a memory, not illustrated. The data stored in the memory is read from it as required for utilization in various kinds of processing.

As illustrated in FIG. 3A, the table generation unit 2010-$n$ includes a secure computation unit 1011-$n$, a control unit 1012-$n$, a random number generation unit 2015-$n$, and a checksum updating unit 2016-$n$. As illustrated in FIG. 3B, the round processing unit 2030-$n$ includes a secure computation unit 1031-$n$, a control unit 1032-$n$, a dummy block generation unit 2035$a$-$n$, a concealing unit 2035$b$-$n$, a concatenating unit 2035$c$-$n$, a random permutation unit 2036-$n$, and checksum updating units 2037-$n$, 2038-$n$.

<Overview of Processing>

The present embodiment generates checksums in different manners for the early-stage process, which involves a small amount of data for processing, and for the later-stage process, which involves a significantly larger amount of data for processing. More specifically, the table generation unit 2010 generates a first checksum for detecting falsification in the early-stage process in accordance with a first scheme and the round processing unit 2030 generates a second checksum for detecting falsification in the later-stage process in accordance with a second scheme. Here, the first scheme is a scheme in which level of security does not depend on the amount of data of a reconstructed value of concealed information for which falsification is to be detected. Examples of the first scheme include those described in Dai Ikarashi, Ryo Kikuchi, Koki Ramada, and Koji Chida, "Actively Private and Correct MPC Scheme in t<n/2 from Passively Secure Schemes with Small Overhead," Cryptology &Print Archive, Report 2014/304, 2014 (Reference Literature 4), and International Publication No. WO/2016/104476 (Reference Literature 5). Meanwhile, the second scheme is a scheme in which the level of security depends on the amount of data of a reconstructed value of concealed information for which falsification is to be detected. That is, the second scheme is a scheme in which security when the amount of data of a reconstructed value of concealed information for which falsification is to be detected is $\alpha_1$ is higher than security when the amount of data of a reconstructed value of concealed information for which falsification is to be detected is $\alpha_2$, where $\alpha_1$ is greater than $\alpha_2$. For example, the second scheme is a scheme in which the security becomes higher as a reconstructed value of concealed information for which falsification is to be detected has a greater amount of data. Examples of the second scheme include those described in Dai Ikarashi, Ryo Kikuchi, Koki Hamada, and Koji Chida, "An Efficient. SIMD Protocol against Malicious Adversaries for Secure Computation Schemes Based on Secret Sharing Schemes with Small Party Sets", Proceedings of Computer Security Symposium 2013, 2013(4), 793-800, 2013-10-14 (Reference Literature 6), and international Publication No. WO/2015/053184 (Reference Literature 7). It is to be noted that, though not specifically mentioned in Reference Literatures 6 and 7, it is preferable that random cyclic shift (random rotation) is used as random permutation for faster processing. Similarly, though also not specifically mentioned in Reference Literatures 6 and 7, it is preferable for faster processing that the sum of the number Y of dummy blocks to be generated and the number of blocks B is a prime number p greater than the number of blocks B. That is, Y=p−B is preferable. More preferably, p is a smallest prime number that is greater than the number of blocks B. The in schemes of Reference Literatures 6 and 7 are on the assumption that dummy blocks can be calculated without being concealed. In the present embodiment, by contrast, dummy blocks are also processed as concealed information. Accordingly, the present embodiment sets a certain one of the dummy blocks as a to-be-processed dummy block and generates a checksum for the to-be-processed dummy block in a third scheme. This ensures high security. The third scheme is a scheme in which level of security does not depend on the amount of data of a reconstructed value of concealed information for which falsification is to be detected. For example, the third scheme is the same as the first scheme.

<Details of Processing>

With FIGS. 6 to 11, details of processing are described.

<<Presumption>>

The presumption is the same as in the first embodiment.

<<Step S2010-*n*>>

As with the first embodiment, the table generation unit 2010-*n* performs an early-stage process to obtain concealed information $\{M(i_0, \ldots, i_{S-1})\}$ of a table $M(i_0, \ldots, i_{S-1})$ having one-variable function values for a variable $i=i_0, \ldots, i_{S-1}$ as its members by secure computation using concealed information of any one of round keys $k_1, \ldots, k_3$. In the present embodiment, the table generation unit 2010-n further generates the first checksum for detecting falsification in the early-stage process in accordance with the first scheme. An example is shown below where the schemes of Reference Literatures 4 and 5 are employed as the first scheme.

Figure 7:
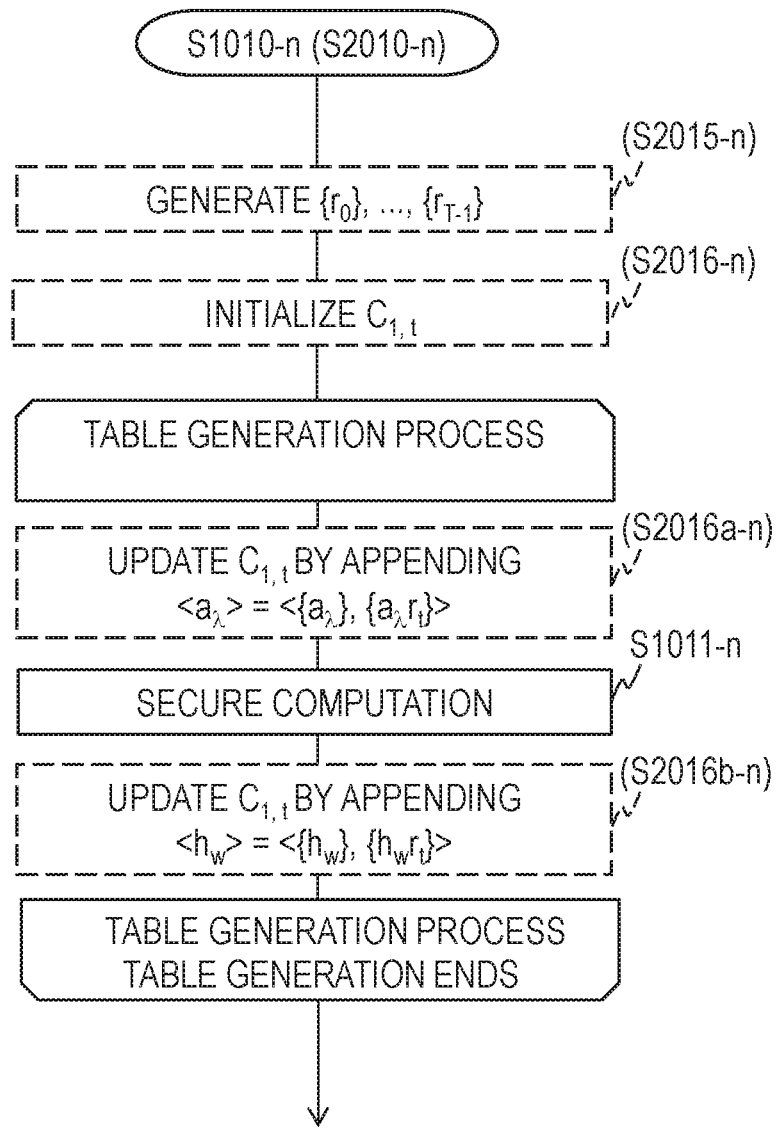
FIG. 7 is a flow diagram for describing the details of a table generation process according to the embodiment.

Details of Step S2010-*n*:

With FIG. 7, details of step S2010-*n* are illustrated. Concealed information in this example is shares in accordance with secret sharing methods. The early-stage process includes secure computation that uses concealed information in accordance with T kinds of secret sharing methods $meth_0, \ldots, meth_{T-4}$. The secure computation is each secure computation executed in the course of step S1010-*n* described above.

The random number generation unit 2015-*n* (FIG. 3A) of the table generation unit 2010-*n* obtains and outputs concealed information $\{r_t\}$ generated by secret sharing of a random number $r_t \in F$ for $t=0, \ldots, T-1$. It is to be noted that T is an integer equal to or greater than 1 and $t=0, \ldots, T-1$ holds. A specific example of the way to generate the concealed information is disclosed in Reference Literature 5. For example, first, the random number generation unit 2015-*n* of the secure computation device 20-*n* each generates a random number $r'_n \in F$. Next, each random number generation unit 2015-*n* generates a share $\{r'_n\}$ of the random number $r'_n$ in accordance with the concealing method described in Reference Literature 2 and sends it to another random number generation unit 2015-*n'* ($n'=0, \ldots, N-1$). Then, each random number generation unit 2015-*n* calculates $\{r_t\}=\Sigma_{n<N}\{r'_n\}$ to obtain the concealed information $\{r_t\}$ of the random number $r_t$. In this manner, the random number generation unit 2015-*n* can obtain the concealed information $\{r_t\}$ of the random number $r_t$ without any of the secure computation devices 20-1 to 20-(N−1) knowing the random number $r_t$ (step S2015-*n*).

Next, the checksum updating unit 2016-*n* initializes $C_{1,t}$ included in the first checksum to a null (empty set). The first checksum may be formed only from $C_{1,t}$ or from $C_{1,t}$ and other information (step S2016-*n*).

Assume that $\Psi$ secure computations $Com_0, \ldots, Com_{\Psi-1}$ are performed in order to obtain the concealed information $\{M(i_0, \ldots, i_{S-1})\}$ in the early-stage process mentioned above. It is to be noted that $\Psi$ is an integer equal to or greater than 1. When secure computation $Com_\psi$ ($\psi=0, \ldots, \Psi-1$) that uses concealed information $\{a_\lambda\} \in \{F\}$ in accordance with the secret sharing method $meth_\tau$ is performed, the checksum updating unit 2016-*n* generates concealed information $\{a^\lambda r_t\}$ by secure computation using concealed information $\{a_\lambda\}$ and concealed information $\{r_t\}$. It is to be noted that $\Lambda$ is an integer equal to or greater than 1 and $\lambda=0, \ldots, \Lambda-1$ holds. Further, the checksum updating unit 2016-*n* obtains a randomized distributed value $\langle a_\lambda \rangle = \langle \{a_\lambda\}, \{a_\lambda r_t\}\rangle$, which is a tuple of the concealed information $\{a_\lambda\}$ and the concealed information $\{a_\lambda r_t\}$, and updates $C_{1,t}$ by appending the randomized distributed value $\langle a_\lambda \rangle$. If multiple pieces of concealed information are used in the secure computation $Com_\psi$, the checksum updating unit 2016-*n* generates randomized distributed values for the respective pieces of concealed information and updates $C_{1,1}$ by appending them (step S2016*a*-*n*).

The secure computation unit -*n* executes the secure computation $Com_\psi$ (step S1011-*n*).

The execution of the secure computation $Com_\psi$ yields concealed information $\{h_w\}$, which is a secure computation result in accordance with the secret sharing method $meth_\tau$.

Then, the checksum updating unit 2016-$n$ obtains concealed information $\{h_w r_t\}$ by secure computation using the concealed information $\{h_w\}$ and the concealed information $\{r_t\}$. It is to be noted that W is an integer equal to or greater than 1 and w=0, . . . , W−1 holds. Further, the checksum updating unit 2016-$n$ obtains a randomized distributed value $\langle h_w \rangle = \langle \{h_w\}, \{h_w r_t\} \rangle$, which is a tuple of the concealed information $\{h_w\}$ and the concealed information $\{h_w r_t\}$, and updates $C_{1,t}$ by appending the randomized distributed value $\langle h_w \rangle$. If the secure computation result contains multiple pieces of concealed information, the checksum updating unit 2016-$n$ generates randomized distributed values for the respective pieces of concealed information and updates $C_{1,t}$ by appending them (step S2016$b$-$n$).

The processing at steps S2016$a$-$n$ to S2016$b$-$n$ is repeated until the $\Psi$ secure computations $Com_0, \ldots, Com_{\Psi-1}$ have been executed and the concealed information $\{M(i_0, \ldots, i_{S-1})\}$ has been obtained. After the concealed information $\{M(i_0, \ldots, i_{S-1})\}$ is obtained, the checksum updating unit 2016-$n$ outputs the first checksum including $C_{1,t} = \langle \phi_0 \rangle, \ldots, \langle \phi_{\Delta-1} \rangle$. It is to be noted that $\delta=0, \ldots, \Delta-1$ holds and $\langle \phi_\delta \rangle$ is a randomized distributed value.

<<Step S1020-$n$>>

This step is the same as in the first embodiment except for it being executed by the secure computation device 20-$n$ in place of the secure computation device 10-$n$.

<<Step S2030-$n$>>

As with the first embodiment, the round processing unit 2030-$n$ performs a later-stage process for obtaining concealed information $\{M_{b, \Gamma, MU}\}$ of a matrix $M_{b, \Gamma, MU}$ which is obtained by execution of the remaining process, by secure computation using concealed information of any one of round keys $k_2, \ldots, k_{R+1}$ and the concealed information $\{M_{b, \gamma, \mu}\}$. In the present embodiment, the round processing unit 2030-$n$ further generates the second checksum for detecting falsification in the later-stage process in accordance with the second scheme. An example is shown below where a scheme in accordance with the change schemes of Reference Literatures 6 and 7 is employed as the second scheme.

Figure 8:
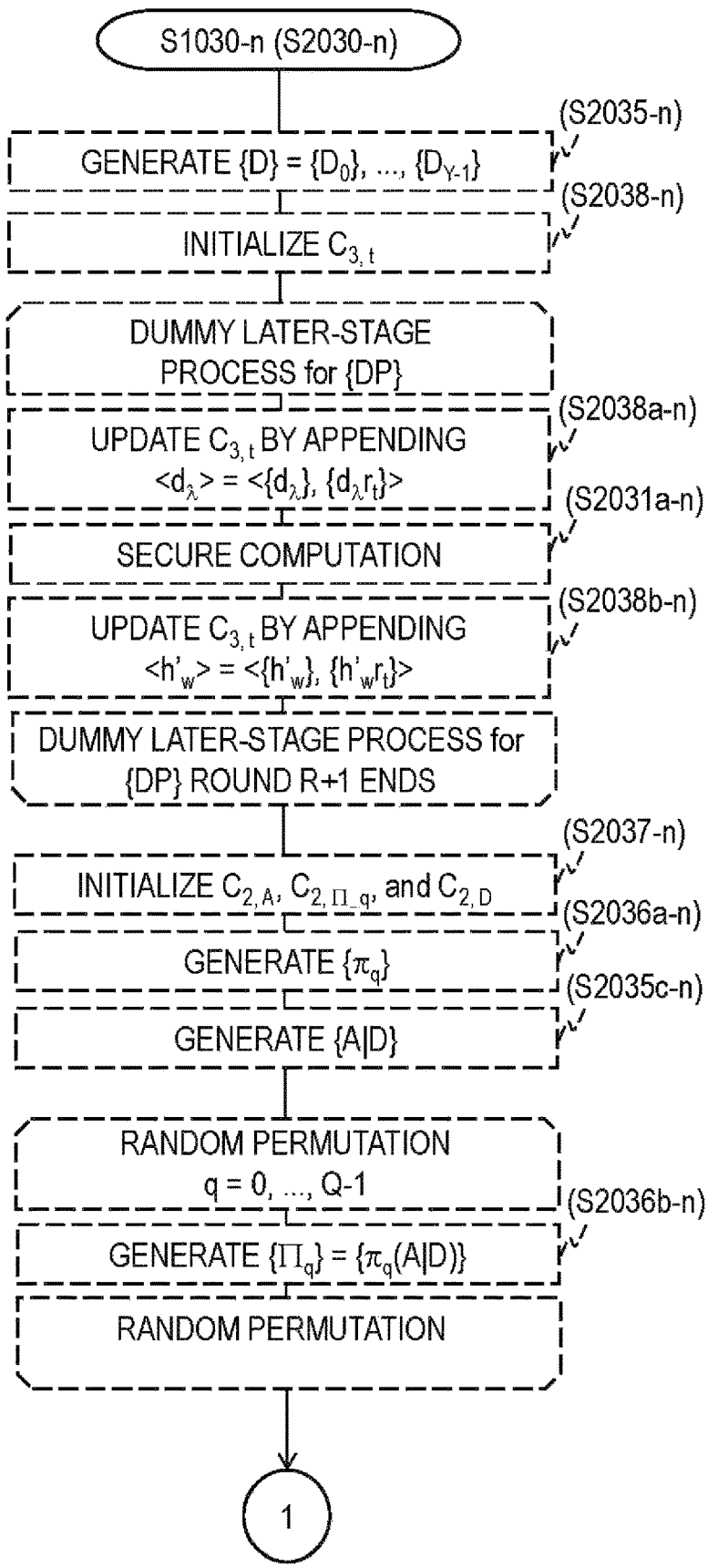
FIG. 8 is a flow diagram for describing the details of round processing according to the embodiment.
Figure 9:
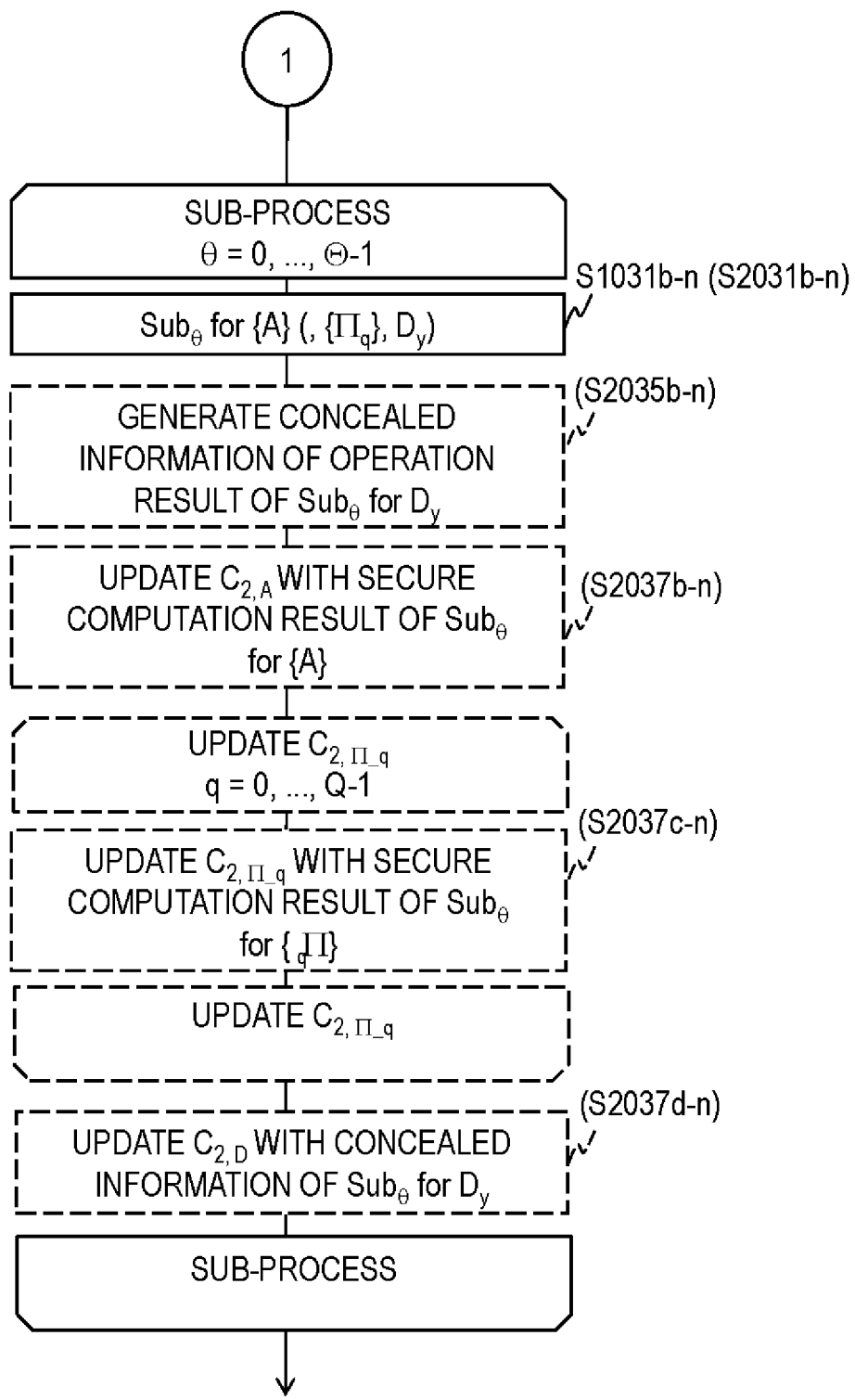
FIG. 9 is a flow diagram for describing the details of round processing according to the embodiment.

Specific Example of Step S2030-$n$:

With FIGS. 8 and 9, a specific example of step S2030-$n$ is shown. Concealed information in this example is shares in accordance with the secret sharing method.

First, the dummy block generation unit 2035$a$-$n$ generates and outputs concealed information $\{D_0\}, \ldots, \{D_{Y-1}\}$ of Y dummy blocks $D_0, \ldots, D_{Y-1} \in F^U$. It is to be noted that Y is an integer equal to or greater than 1 and y=0, . . . , Y−1 holds. As mentioned earlier, Y=p−B is preferable. It is to be noted that p is a prime number greater than B. A certain one of the dummy blocks $D_0, \ldots, D_{Y-1}$ is set as a to-be-processed dummy block DP. There may be one to-be-processed dummy block DP or two or more to-be-processed dummy blocks DR Dummy blocks $D_{y'}$ other than the to-be-processed dummy block DP are public values. The dummy block generation unit 2035$a$-$n$ conceals the dummy block $D_{y'}$, which is a public value, by a method with correctness to obtain concealed information $\{D_{y'}\}$. The to-be-processed dummy block DP may or may not be a public value. In the former case, the dummy block generation unit 2035$a$-$n$ conceals the dummy block DP, which is a public value, to obtain concealed information $\{DP\}$. In the latter case, the dummy block generation unit 2035$a$-$n$ obtains concealed information $\{M(i_{dp, 0}, \ldots, i_{dp, S-1})\}$, for example, by secure computation using the aforementioned concealed information $\{M(i_0, \ldots, i_{S-1})\}$ and concealed information $\{i_{dp, 0}\}, \ldots, \{i_{dp, S-1}\}$ of a certain one of counter values $i_{dp, 0}, \ldots, i_{dp, S-1}$, and obtains concealed information $\{DP\} = \{M(i_{dp, 0}, \ldots, i_{dp, S-1})\}$ (step S2035-$n$).

Next, the round processing unit 2030-$n$ performs a dummy later-stage process for obtaining concealed information $\{M_{DP, \Gamma, MU}\}$ of a matrix $M_{DP, \Gamma, MU}$ using concealed information of any necessary one of the round keys $k_2, \ldots, K_{R+1}$ and the concealed information $\{DP\}$ of the to-be-processed dummy block DR It is to be noted that the matrix $M_{DP, \Gamma, MU}$ is a processing result obtained by performing the aforementioned remaining process on the to-be-processed dummy block DP. An example with $\Gamma=R+1$ and MU=4 is described here. Then, a third checksum for detecting falsification in the dummy later-stage process is generated in accordance with a third scheme. The third scheme is a scheme in which security does not depend on the amount of data of a reconstructed value of concealed information which is subjected to the dummy later-stage process. The third scheme may or may not be the same as the first scheme. In the example shown herein, the third scheme and the first scheme are the same as each other.

First, the checksum updating unit 2038-$n$ initializes $C_{3,t}$ included. in the third checksum to a null (empty set). The third checksum may be formed only from $C_{3,t}$ or from $C_{3,t}$ and other information (step S2038-$n$).

Assume that $\Psi'$ secure computations $Com3_0, \ldots, Com3_{\Psi', 4}$ are performed in the aforementioned remaining process. It is to be noted that $\Psi'$ is an integer equal to or greater than 1. When secure computation $Com3_{\psi'}$ ($\psi'=0, \ldots, \psi'-1$) that uses concealed information $\{d_\lambda\} \in \{F\}$ in accordance with the secret sharing method meth$_t$ is performed, the checksum updating unit 2038-$n$ generates concealed information $\{d_\lambda r_t\}$ by secure computation using the concealed information $\{d_\lambda\}$ and concealed information $\{r_t\}$. It is to be noted that $\Lambda$ is an integer equal to or greater than 1 and $\lambda=0, \ldots, \Lambda-1$ holds. The checksum updating unit 2038-$n$ further obtains a randomized distributed value $\langle d_\lambda \rangle = \langle \{d_\lambda\}, \{d_\lambda r_t\} \rangle$, which is a tuple of the concealed information $\{d_\lambda\}$ and the concealed information $\{d_\lambda r_t\}$, and updates $C_{3,t}$ by appending the randomized distributed value $\langle d_\lambda \rangle$ (step S2038$a$-$n$).

The secure computation unit 1031-$n$ executes secure computation $Com3,\psi'$ (step S2031$a$-$n$).

The execution of the secure computation $Com3_{\psi'}$ yields concealed information $\{h'_w\}$, which is a secure computation result in accordance with the secret sharing method meth$_t$. Then, the checksum updating unit 2038-$n$ obtains concealed information $\{h'_w r_t\}$ by secure computation using the concealed information $\{h'_w\}$ and the concealed information $\{r_t\}$. It is to be noted that W is an integer equal to or greater than 1 and w=0, . . . , W−1 holds. The checksum updating unit 2038-$n$ further obtains a randomized distributed value $\langle h'_w \rangle = \langle \{h'_w\}, \{h'_w r_t\} \rangle$, which is a tuple of the concealed information $\{h'_w\}$ and the concealed information $\{h'_w r_t\}$, and updates $C_{3,t}$ by appending the randomized distributed value $\langle h'_w \rangle$. If the secure computation result contains multiple pieces of concealed information, the checksum updating unit 2038-$n$ generates randomized distributed values for the respective pieces of concealed information and updates $C_{3,t}$ by appending them (step S2038$b$-$n$).

The processing at steps S2038$a$-$n$ to S2038$b$-$n$ is repeated until the $\Psi'$ secure computations $Com3_0, \ldots, Com3_{\Psi'-1}$ have been executed and concealed information $\{M_{DP, \gamma, MU}\}$ has been obtained. When $\Gamma=R+1$ and MU=4, the processing at steps S2038$a$-$n$ to S2038$b$-$n$ is repeated until the R+1th round ends. After the concealed information $\{M_{DP, \Gamma, MU}\}$ is obtained, the checksum updating unit 2038-$n$ outputs the third checksum including $C_{3,t} = \langle \phi 3_0 \rangle, \ldots, \langle \phi 3_{\Lambda'-1} \rangle$. It is to be noted that $\delta'=0, \ldots, \Delta'-1$ holds and $<\phi3_{\delta'}>$ is a randomized distributed value.

Next, the checksum updating unit 2037-$n$ initializes $C_{2, A}$, $C_{2, \Pi\_q}$, and $C_{2, D}$ included in the second checksum to a null (empty set). The second checksum may be formed only from $C_{2, A}, C_{2, \theta\_q}$, and $C_{2, D}$ or from $C_{2, A}, C_{2, \Pi\_q}, C_{2, D}$, and other information (step S2037-$n$).

The random permutation unit 2036-$n$ generates concealed information $\{\pi_q\}$ of random permutation information $\pi_q$ representing the content of random permutation. It is to be noted that Q is an integer equal to or greater than 1 and $q=0, \ldots, Q-1$ holds. Preferably, the random permutation information $\pi_q$ it is information representing random cyclic shift (step S2036$a$-$n$).

To the concatenating unit 2035$c$-$n$, the concealed information $\{M_{b, \gamma, \mu}\}$ for $b=0, \ldots, B-1$ obtained at step S1020-$n$ and the concealed information $\{D_0\}, \ldots, \{D_{Y-1}\}$ obtained at step S2035-$n$ are input. Using them and by secure computation, the concatenating unit 2035$c$-$n$ obtains concealed information $\{A|D\}=\{A|D_0|D_{Y-1}\}$ by concatenating concealed information $\{A\}$ of a non-randomized sequence $A \in F^{UB}$ formed from the members of matrices $M_{0, \gamma, \mu}, \ldots, M_{B-1, \gamma, \mu}$ and concealed information $\{D_0\}, \ldots, \{D_{Y-1}\}$ of Y dummy blocks $D_0, \ldots, D_{Y-1} \in F^U$. It is to be noted that $\alpha|\beta$ represents concatenating (joining) of $\alpha$ and $\beta$ (step S2035$c$-$n$).

The random permutation unit 2036-$n$ obtains, by secure computation, concealed information $\{\Pi_q\}=\{\pi_q(A|D)\}$ of a randomized sequence $\Pi_q=\pi_q(A|D) \in F^{U(B+Y)}$ which is obtained by random permutation of A|D using the concealed information $\{\pi_q\}$ and the concealed information $\{A|D\}$ and outputs it. This processing is executed for each value of $q=0, \ldots, Q-1$ (step S2036$b$-$n$).

Assume that secure computations for $\Theta$ sub-processes $Sub_0, \ldots, S_{\Theta-1}$ are performed in the aforementioned remaining process. It is to be noted that $\Theta$ is an integer equal to or greater than 1 and $\theta=0, \ldots, \Theta-1$ holds. The secure computation unit 1031-$n$ uses concealed information $\{A\}$ to execute secure computation of each sub-process $Sub_\theta$ for each piece of concealed information $\{M_{b, \gamma, \mu}\}$ corresponding to U members of the matrix $M_{b, \gamma, \mu}$ which form the non-randomized sequence A. That is, the secure computation unit 1031-$n$ executes the secure computation of each sub-process $Sub_\theta$ for each piece of concealed information $\{M_{b, \gamma, \mu}\}$. The secure computation unit 1031-$n$ thereby obtains the concealed information $\{M_{b, \Gamma, MU}\}$ of the matrix $M_{b, \Gamma, MU}$, which is obtained by application of the remaining process to each matrix $M_{b, \gamma, \mu}$ forming the non-randomized sequence A. The secure computation unit 1031-$n$ also executes the secure computation of each sub-process $Sub_\theta$ for each piece of concealed information $\{\Pi_{q, b'', \gamma, \mu}\} \in \{F^U\}$ corresponding to U members $\Pi_{q, b'', \gamma, \mu} \in F^U$ forming the randomized sequence $\Pi_q \in F^{U(B+Y)}$ for $q=0, \ldots, Q-1$ using concealed information $\{\Pi_q\}$. That is, the secure computation unit 1031-$n$ executes the secure computation of each sub-process $Sub_\theta$ for each piece of concealed information $\{\Pi_{q, b'', \gamma, \mu}\}$. It is to be noted that $b''=0, \ldots, B-1, \ldots, B+Y-1$ and $\Pi_q=\Pi_{q, \theta, \gamma, \mu}| \ldots |\Pi_{q, B+Y-1, \gamma, \mu}$ hold. In this manner, the secure computation unit 1031-$n$ obtains concealed information $\{\Pi_{q, b'', \Gamma, MU}\} \in \{F^U\}$ as the secure computation result of each sub-process $Sub_\theta$. The secure computation unit 1031-$n$ further executes each sub-process $Sub_\theta$ on at least some of the dummy blocks $D_y$ (for example, dummy blocks $D_y$ excluding the to-be-processed dummy block DP), thereby obtaining operation result $D_{y, \Gamma, MU} \in F^U$ of the sub-process $Sub_\theta$ (step S2031$b$-$n$).

The concealing unit 2035$b$-$n$ conceals the operation result $D_{y, \Gamma, MU}$ by a method with correctness to obtain concealed information $\{D_{y, \Gamma, MU}\}$ and outputs it (step S2035$b$-$n$).

The checksum updating unit 2037-$n$ updates $C_{2, A}$ with concealed information $\{M_{b, \theta, \Gamma, MU}\} \in \{F^U\}$, which is the secure computation result of each sub-process $Sub_\theta$ generated in the course of obtaining the concealed information $\{M_{b, \Gamma, MU}\}$. For example, when $C_{2, A}=(C_{0, 2, A}, \ldots, C_{B-1, 2, A})$, the checksum updating unit 2037-$n$ sets $(C_{0, 2, A}|\{M_{0, \theta, \Gamma, MU}\}, \ldots, C_{B-1, 2, A}|\{M_{B-1, \theta, \Gamma, MU}\})$ as the new $C_{2, A}$ (step S2037$b$-$n$).

The checksum updating unit 2037-$n$ also updates $C2, \Pi\_q$ with concealed in formation $\{\Pi_{q, b'', \theta, \Gamma, MU}\} \in \{F^U\}$, which is the secure computation result of each sub-process $Sub_\theta$, for $q=0, \ldots, Q-1$. For example, when $C_{2, \Pi\_q}=(C_{0, 2, \Pi\_q}, \ldots, B_{B+Y-1, 2, \Pi\_q})$, the checksum updating unit 2037-$n$ sets $(C_{0, 2, \Pi\_q}|\{\Pi_{q, 0, \theta, \Gamma, MU}\}, \ldots, C_{B+Y-1, 2, \Pi\_q}|\{\Pi_{q, B+Y-1, \theta, \Gamma, MU}\})$ as the new $C_{2, \Pi\_q}$ (step S2037$c$-$n$).

The checksum updating unit 2037-$n$ further updates $C_{2, D}$ with concealed information $\{D_{y, \theta, \Gamma, MU}\} \in \{F^U\}$ for the operation result of each sub-process $Sub_\theta$. For example, when $C_{2, D}=(C_{0, 2, D}, \ldots, C_{Y-1, 2, D})$, the checksum updating unit 2037-$n$ sets $(C_{0, 2, D}|\{D_{0, \theta, \Gamma, MU}\}, \ldots, C_{Y-1, 2, D}|\{D_{Y-1, \theta, \Gamma, MU}\})$ as the new $C_{2, D}$ (step S2037$d$-$n$).

The processing at steps S2031$b$-$n$ to S2037$d$-$n$ is executed for all. of the $\Theta$ sub-processes $Sub_\theta, \ldots, Sub_{\Theta-1}$. After that, the checksum updating unit 2037-$n$ outputs the second checksum including $C_{2, A}, C_{2, \Pi\_q}$, and $C_{2, D}$.

<<Step S1041-$n$>>

This step is the same as in the first embodiment except for it being executed by the secure computation device 20-$n$ in place of the secure computation device 10-$n$.

<<Step S2042-$n$>>

The synchronization unit 2042-$n$ executes a synchronization process to wait until all the secure computations on all of the secure computation devices 20-1 to 20-(N-1) are completed. When N=1, no synchronization process is performed.

<<Step S2043-$n$>>

To the correctness verification unit 2043-$n$, the first checksum including $C_{1, t}=<\phi_0>, \ldots, <\phi_{\Delta-1}>$ and the third checksum including $C_{3, t}=<\phi3_0>, \ldots, <\phi3_{\Delta'-1}>$ are input. The correctness verification unit 2043-$n$ verifies the correctness of $C_{1, t}$ and $C_{3, t}$ as described in. Reference Literatures 4 and 5.

To verify the correctness of $C_{1, t}$, the correctness verification unit 2043-$n$ determines concealed information $\{r_t(\phi_0+ \ldots +\phi_{\Delta-1})\}$ of a result determined by multiplying the total sum of $\phi_0, \ldots, \phi_{\Delta-1}$ by $r_t$, by secure computation using $\{\phi_0\}, \ldots, \{\phi_{\Delta-1}\}$ and $\{r_t\}$, where $<\phi_0>=<\{\phi_0\}, \{\phi_0 r_t\}>, \ldots, <\phi_{\Delta-1}>=<\{\phi_{\Delta-1}\}, \{\phi_{\Delta-1} r_t\}>$. The correctness verification unit 2043-$n$ further determines concealed information $\{\phi_0 r_t+ \ldots +\phi_{\Delta-1} r_t\}$ for the total sum of $\phi_0 r_t, \ldots, \phi_{\Delta-1} r_t$ by secure computation using $\{\phi_0 r_t\}, \ldots, \{\phi_{\Delta-1} r_t\}$. The correctness verification unit 2043-$n$ obtains concealed information $\{DC_{1, t}\}$ of $DC_{1, t}=r_t(\phi_0+ \ldots +\phi_{\Delta-1})-(\phi_0 r_t+ \ldots +\phi_{\Delta-1} r_t)$ by secure computation using concealed information $\{r_t(\phi_0+ \ldots +\phi_{\Delta-1})\}$ and $\{\phi_0 r_1+ \ldots +\phi_{\Delta-1} r_t\}$, and reconstructs $DC_{1, t}$. The correctness verification unit 2043-$n$ determines that there was no falsification in the early-stage process if $DC_{1, t}=0$ for all of $t+0, \ldots, T-1$ and that there was a falsification in the early-stage process otherwise.

To verify the correctness of $C_{3, t}$, the correctness verification unit 2043-$n$ determines concealed information $\{r_t$ $(\phi3_0+ \ldots +\phi3_{A'-1})\}$ of a result determined by multiplying the total sum of $\phi3_0, \ldots, \phi3_{A'-1}$ by $r_t$, secure computing using $\{\phi3_0\}, \ldots, \{\phi3_{A'-1}\}$ and $\{r_t\}$, where $<\phi3_0>=<\{\phi3_0\}, \{\phi3_0 r_t\}>, \ldots, <\{\phi3_{A'-1}\}=<\phi3_{A'-1}\}, \{\phi3_{A'-1}r_t\}>$. The correctness verification unit 2043-*n* further determines concealed information $\{\phi3_0 r_t + \ldots + \phi3_{A'-1} r_t\}$ for the total sum of $\phi3_0 r_1, \ldots, \phi3_{A'-1} r_1$ by secure computation using $\{\phi3_0 r_t\}, \ldots, \{\phi3_{A'-1} r_t\}$. The correctness verification unit 2043-*n* obtains concealed information $\{DC_{3,\,t}\}$ of $DC_{3,\,t}=r_t(\phi3_0+ \ldots +\phi3_{A'-1})-(\phi3_0 r_t + \ldots +\phi2_{A'-1}r_t)$ by secure computation using concealed information $\{r_t(\phi3_0+ \ldots +\phi3_{A'-1})\}$ and $\{\phi3_0 r_t + \ldots +3_{A'-1}r_t\}$, and reconstructs $DC_{3,\,t}$. The correctness verification unit 2043-*n* determines that there was no falsification in the later-stage process if $DC_{3,\,t}=0$ for all of $t=0, \ldots, T-1$ and that there was a falsification in the later-stage process otherwise.

<<Step S2044-*n*>>

To the correctness verification unit 2044-*n*, the second checksum including $C_{2,\,A}$, $C_{2,\,\Pi\_q}$, and $C_{2,\,D}$ and the concealed information $\{\pi_q\}$ are input. The correctness verification unit 2044-*n* verifies the correctness of $C_{2,\,A}$, $C_{2,\,\Pi\_q}$, and $C_{2,\,D}$ as described in Reference Literatures 5 and 6. Specifically, the correctness verification unit 2044-*n* makes the concealed information $\{\pi_q\}$ public to obtain random permutation information $\pi_q$, and using $\pi_q$, $C_{2,\,A}$, $C_{2,\,\Pi\_q}$, and $C_{2,\,D}$ and by secure computation, obtains concealed information $\{\zeta_q\}=\{\zeta_{0,\,q}\}, \ldots, \{\zeta_{B+Y-1,\,q}\}$ of a sequence generated by subtracting the reconstructed value of a sequence determined by random permutation of $C_{2,\,A}|C_{2,\,D}$ in accordance with $\pi_q$ from the reconstructed value of $C_{2,\,\Pi\_q}$. The correctness verification unit 2044-*n* divides each member $\{\zeta_{b'',\,q}\}$ ($b''=0, \ldots, B+Y-1$) of the concealed information $\{\zeta_q\}=\{\zeta_{0,\,q}\}, \ldots, \{\zeta_{B+Y-1,\,q}\}$ for each element of $\{F^U\}$, thus obtaining a sequence of $\{\zeta'_{b'',\,q,\,0}\}, \ldots, \{\zeta'_{b'',\,q,\,M''-1}\} \in \{F^U\}$. It is to be noted that M" is a positive integer. Members less than $\{F^U\}$ are padded with $\{0\}$. The correctness verification unit 2044-*n* performs multiply-accumulate operation of concealed information $\{ran\}$ of a random number ran and $\{\zeta'_{b'',\,q,\,0}\}, \ldots, \{\zeta'_{b'',\,q,\,M''-1}\}$ by secure computation and make the result $\{\zeta\}$ public to obtain $\zeta$. The correctness verification unit 2044-*n* determines that there was no falsification in the later-stage process if $\zeta$ is 0 and that there was a falsification in the later-stage process otherwise.

<Features of the Present Embodiment>

As with the first embodiment, the present embodiment also can efficiently execute round processing that repeats permutation of members, cyclic shifting of rows, linear summation of columns, and addition of round keys by means of secure computation. The present embodiment in particular generates the first checksum for detecting falsification in the early-stage process in accordance with the first scheme and generates the second checksum for detecting falsification in the later-stage process in accordance with the second scheme. Compared to the early-stage process, the later-stage process involves a significantly larger amount of data for processing. The second scheme is a scheme in which the security becomes higher with a greater amount of data for processing, being suited for detecting falsification in the later-stage process. By contrast, use of the second scheme is not efficient in the early-stage process because the early-stage process involves a small amount of data for processing. By varying the way of generating the checksums in the early-stage process and the later-stage process, the present embodiment can efficiently implement. highly secure communication. If a falsification is detected in the early-stage process, all the processing is discarded. If a falsification is detected in the later-stage process, by contrast, all the processing may be discarded or only the later-stage process may be discarded.

[Modifications of the Second Embodiment]

The second embodiment showed an example where randomized distributed values are generated and $C_{1,\,t}$ is updated for all of the $\Psi$ secure computations $Com_0, \ldots, Com_{\Psi-1}$ (FIG. 7). However, randomized distributed values may be generated and $C_{1,\,t}$ may be updated only for some of the $\Psi$ secure computations $Com_0, \ldots, Com_{\Psi-1}$. For example, randomized distributed values may be generated and $C_{1,\,t}$ may be updated up to the last secure computation that requires communication among the $\Psi$ secure computations $Com_0, \ldots, Com_{\Psi-1}$. For example, when concealed information $\{M(i_0, \ldots, i_{S-1})\}$ is concealed information $\{M_{b,\,3,\,1}\}$ or $\{M_{b,\,3,\,2}\}$, randomized distributed values may be generated and $C_{1,\,t}$ may be updated up to secure computation that requires communication for the permutation process $P_{3,\,1}$ (for example, secure computation of multiplicative inverse element operation for SubBytes).

Alternatively, randomized distributed values may be generated and $C_{1,\,t}$ may be updated before and after each secure computation performed at step S1020-*n*. That is, when secure computation that uses concealed information $\{a_\lambda\}$ in accordance with the secret sharing method meth, is performed at step S1020-*n*, concealed information $\{a_\lambda r_t\}$ may be obtained by secure computation using concealed information $\{a_\lambda\}$ and concealed information $\{r_t\}$, then a randomized distributed value $<a_\lambda>=<\{a_\lambda\}, \{a_\lambda r_t\}>$, which is a tuple of the concealed information $\{a_\lambda\}$ and the concealed information $\{a_\lambda r_t\}$, may be obtained, and $C_{1,\,t}$ may be updated by appending the randomized distributed value $<a_\lambda>$. Further, upon obtaining concealed information $\{h_w\}$, which is a secure computation result in accordance with the secret sharing method meth$_t$, at step S1020-*n*, concealed information $\{h_w r_t\}$ may be obtained by secure computation using the concealed information $\{h_w\}$ and the concealed information $\{r_t\}$, a randomized distributed value $<h_w>=<\{h_w\}, \{h_w r_t\}>$, which is a tuple of the concealed information $\{h_w\}$ and the concealed information $\{h_w r_t\}$, may be obtained, and $C_{1,\,t}$ may be updated by appending the randomized distributed value $<h_w>$, thus updating the first checksum including $C_{1,\,t}$.

Also, a checksum for detecting falsification at step S1041-*n* may be generated and verified. This checksum is preferably generated in accordance with the second scheme.

[Other Modifications and so Forth]

It is to be noted that the present invention is not limited to the foregoing embodiments. The above-described various kinds of processing may be executed, in addition to being executed in chronological order in accordance with the descriptions, in parallel or individually depending on the processing power of a device that executes the processing or when necessary. In addition, it goes without saying that changes may be made as appropriate without departing from the spirit of the present invention.

The above-described each device is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional components by loading of programs like a CPU. An electronic circuit constituting a single device may include multiple CPUs, When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present devices, at least some of the processing functions may be implemented by hardware.

DESCRIPTION OF REFERENCE NUMERALS 1, 2 secure computation system
10-$n$, 20-$n$ secure computation device

What is claimed is:

1. A secure computation device among a plurality of secure computation devices performing secure computation for a block cipher, wherein
B is an integer equal to or greater than 1, R is an integer equal to or greater than 3, S is an integer equal to or greater than 2, $U=S^2$ holds, F is a finite field, $b=0, \ldots, B-1$ holds, $r=1, \ldots, R$ holds, and $j=2, R$ holds,
the secure computation device is configured to perform, in cooperation and in communication over a network with the remaining of the plurality of secure computation devices, round processing in a first round includes a process $P_{1,4}$, the process $P_{1,4}$ including processing for obtaining a matrix $M_{b,1,4}$ by adding S counter values $i_{b,0}, \ldots, i_{b,S-1}$ to S members in one of columns of an S×S matrix that is formed from members of a round key $k_1 \in F^U$ of the first round, respectively, round processing in a jth round includes a process $P_{j,1}$, a process $P_{j,2}$, a process $P_{j,3}$, and a process $P_{j,4}$, the process $P_{j,1}$ including processing for obtaining a matrix $M_{b,j,1}$ by permutation of members of a matrix $M_{b,j-1,4}$, the process $P_{j,2}$ including processing for obtaining a Matrix $M_{b,j,2}$ by cyclically shifting members of the matrix $M_{b,j,1}$ on a per-row basis, the process $P_{j,3}$ including processing for obtaining a matrix $M_{b,j,3}$ which has linear sums of S members of each column of the matrix $M_{b,j,2}$ as the S members of that column, and the process $P_{j,4}$ including processing for obtaining a matrix $M_{b,j,4}$ by adding the respective members of a round key $k_j$ of the jth round to the respective members of the matrix $M_{b,j,3}$, and the secure computation device includes processing circuitry configured to
receive concealed information $\{P_b\}$ of plaintext block $P_b$, which is a divided share such that each of the plurality of secure computation devices receive a different share of concealed information $\{P_b\}$ from among concealed information concealed information $\{P_0\}, \ldots, \{P_{B-1}\}$ that is generated based on dividing plaintext P for encryption into plaintext blocks $P_0, \ldots, P_{B-1}$ and performing secret sharing such that the plaintext block P is concealed from each of the plurality of secure computation devices, the processing circuitry being further configured to implement:
a table generation unit that performs an early-stage process for obtaining concealed information $\{M(i_0, \ldots, i_{S-1})\}$ of a table $M(i_0, \ldots, i_{S-1})$ having one-variable function values for a variable $i=i_0, \ldots, i_{S-1}$ as its members, by secure computation using concealed information of any one of round keys $k_1, \ldots, k_3$, a table calculation unit that obtains concealed information $\{M_{b,\gamma,\mu}\}$ of a matrix $M_{b,\gamma,\mu}$ for $b=0, \ldots, B-1$ by secure computation using concealed information $\{i_{b,0}\}, \ldots, \{i_{b,S-1}\}$ of the counter values $i_{b,0}, \ldots, i_{b,S-1}$ and the concealed information $\{M(i_0, \ldots, i_{S-1})\}$, where $M(i_{b,0}, \ldots, i_{b,S-i})$ generated by substituting the counter values $i_{b,0}, \ldots, i_{b,S-1}$ into the table $M(i_0, \ldots, i_{S-1})$ represents the matrix $M_{b,\gamma,\mu}$, which is any one of $M_{b,2,1}, \ldots, M_{b,3,2}$, a round processing unit that performs a later-stage process for obtaining concealed information $\{M_{b,\Gamma,MU}\}$ of a matrix $M_{b,\Gamma,MU}$ which is obtained by execution of a remaining process, by secure computation using concealed information of any one of round keys $k_2, \ldots, k_{R+1}$ and the concealed information $\{M_{b,\gamma,\mu}\}$, where the remaining process includes those processes among the process $P_{j,1}$, the process $P_{j,2}$, the process $P_{j,3}$, and the process $P_{j,4}$ for $j=2, \ldots, R$ that are performed subsequent to a process $P_{\gamma,\mu}$, and an addition unit that performs an addition process for obtaining concealed information $\{C_b\}$ of $C_b = M_{b,R+1,4} + P_b$ by secure computation using the obtained concealed information $\{M_{b,\Gamma,MU}\}$ of a matrix $M_{b,\Gamma,MU}$ and the received concealed information $\{P_b\}$ and outputting the concealed information $\{C_b\}$ of $C_b=M_{b,\,R+1,\,4}+P_b$, wherein all of the plurality of secure computation devices output different shares of concealed information $\{C_b\}$ of $C_b=M_{b,\,R+1,\,4}+P_b$ which can be reconstructed externally to the plurality of secure computation devices to obtain the plaintext data P.

2. The secure computation device among a plurality of secure computation devices performing secure computation for a block cipher, wherein B is an integer equal to or greater than 1, R is an integer equal to or greater than 3, S is an integer equal to or greater than 2, $U=S^2$ holds, F is a finite field, $b=0,\ldots,B-1$ holds, $r=1,\ldots,R$ holds, and $j=2,\ldots,R$ holds, the secure computation device is configured to perform, in cooperation and in communication over a network with the remaining of the plurality of secure computation devices, round processing in a first round includes a process $P_{1,\,4}$, the process $P_{1,\,4}$ including processing for obtaining a matrix $M_{b,\,1,\,4}$ by adding S counter values $i_{b,\,0},\ldots,i_{b,\,S-1}$ to S members in one of columns of an S×S matrix that is formed from members of a round key $k_1 \in F^U$ of the first round, respectively, round processing in a jth round includes a process $P_{j,\,1}$, a process $P_{j,\,2}$, a process $P_{j,\,3}$, and a process $P_{j,\,4}$, the process $P_{j,\,1}$ including processing for obtaining a matrix $M_{b,j,\,1}$ by permutation of members of a matrix $M_{b,\,j-1,\,4}$, the process $P_{j,\,2}$ including processing for obtaining a matrix $M_{b,\,j,\,2}$ by cyclically shifting members of the matrix $M_{b,\,j,\,1}$ on a per-row basis, the process $P_{j,\,3}$ including processing for obtaining a matrix $M_{b,\,j,\,3}$ which has linear sums of S members of each column of the matrix $M_{b,\,j,\,2}$ as the S members of that column, and the process $P_{j,\,4}$ including processing for obtaining a matrix $M_{b,\,j,\,4}$ by adding the respective members of a round key $k_j$ of the jth round to the respective members of the matrix $M_{b,\,j,\,3}$, and the secure computation device includes processing circuitry configured to receive concealed information $\{P_b\}$ of plaintext block $P_b$, which is a divided share such that each of the plurality of secure computation devices receive a different share of concealed information $\{P_b\}$ from among concealed information concealed information $\{P_0\},\ldots,\{P_{B-1}\}$ that is generated based on dividing plaintext P for encryption into plaintext blocks $P_0,\ldots,P_{B-1}$ and performing secret sharing such that the plaintext block P is concealed from each of the plurality of secure computation devices the processing circuitry being further configured to implement:

a table generation unit that performs an early-state process for obtaining concealed information $\{M(i_0,\ldots,i_{S-1})\}$ of a table $M(i_0,\ldots,i_{S-1})$ having one-variable function values for a variable $i=i_0,\ldots,i_{S-1}$ as its members, by secure computation using concealed information of any one of round keys $k_1,\ldots,k_3$, a table calculation unit that obtains concealed information $\{M_{b,\,\gamma,\,\mu}\}$ of a matrix $M_{b,\,\gamma,\,\mu}$ for $b=0,\ldots,B-1$ by secure computation using concealed information $\{i_{b,\,0}\},\ldots,\{i_{b,\,S-1}\}$ of the counter values $i_{b,\,0},\ldots,i_{b,\,S-1}$ and the concealed information $\{M(i_0,\ldots,i_{S-1})\}$, where $M(i_{b,\,0},\ldots,i_{b,\,S-1})$ generated by substituting the counter values $i_{b,\,0},\ldots,i_{b,\,S-1}$ into the table $M(i_0,\ldots,i_{S-1})$ represents the matrix $M_{b,\,\gamma,\,\mu}$, which is any one of the matrix $M_{b,\,2,\,1}, M_{b,\,2,\,2}, M_{b,\,2,\,3}, M_{b,\,2,\,4}, M_{b,\,3,\,1}$, or $\ldots, M_{b,\,3,\,2}$, a round processing unit that performs a later-state process for obtaining concealed information $\{M_{b,\,\Gamma,\,MU}\}$ of a matrix $M_{b,\,\Gamma,\,MU}$ which is obtained by execution of a remaining process, by secure computation using concealed information of any one of round keys $k_2,\ldots,k_{R+1}$ and the concealed information $\{M_{b,\,\gamma,\,\mu}\}$, where the remaining process includes those processes among the process $P_{j,\,1}$, the process $P_{j,\,2}$, the process $P_{j,\,3}$, and the process $P_{j,\,4}$ for $j=2,\ldots,R$ that are performed subsequent to a process $P_{\gamma,\,\mu}$, and an additio unit that performs an addition process for obtaining concealed information $\{C_b\}$ of $C_b=M_{b,\,R+1,\,4}+P_b$ by secure computation using the obtained concealed information $\{M_{b,\,\Gamma,\,MU}\}$ of a matrix $M_{b,\,\Gamma,\,MU}$ and the received concealed information $\{P_b\}$ and outputting the concealed information $\{C_b\}$ of $C_b=M_{b,\,R+1,\,4}+P_b$, wherein all of the plurality of secure computation devices output different shares of concealed information $\{C_b\}$ of $C_b=M_{b,\,R+1,\,4}+P_b$ which can be reconstructed externally to the plurality of secure computation devices to obtain the plaintext data P, wherein the table generation unit generates a first checksum for detecting falsification in the early-stage process in accordance with a first scheme, the round processing unit generates a second checksum for detecting falsification in the later-stage process in accordance with a second scheme, the first scheme is a scheme in which level of security does not depend on an amount of data of a reconstructed value of concealed information for which falsification is to be detected, and the second scheme is a scheme in which security when the amount of data of a reconstructed value of concealed information for which falsification is to be detected is $\alpha_1$ is higher than security when the amount of data of a reconstructed value of concealed information for which falsification is to be detected is $\alpha_2$, where $\alpha_1$ is greater than $\alpha_2$.

3. The secure computation device according to claim 2, wherein

T, A, Y, Q, and $\Theta$ are integers equal to or greater than 1, $t=0,\ldots,T-1$ holds, $\lambda=0,\ldots,\Lambda-1$ holds, $w=0,\ldots,W-1$ holds, $y=0,\ldots,Y-1$ holds, $q=0,\ldots,Q-1$ holds, $\downarrow=0,\ldots,\Theta-1$ holds, and the early-stage process includes secure computation that uses concealed information in accordance with T kinds of secret sharing methods $meth_0,\ldots,meth_{T-1}$, (1) processing for generating the first checksum in accordance with the first scheme includes (1-1) processing for obtaining concealed information $\{r_t\}$ by secret sharing of a random number $r_t$, and (1-2) processing for, when performing secure computation that uses concealed information $\{a_\lambda\}$ in accordance with a secret sharing method meth, obtaining concealed information $\{a_\lambda r_t\}$ by secure computation using the concealed information $\{a_\lambda\}$ and the concealed information $\{r_t\}$, obtaining a randomized distributed value $<a_\lambda>=<\{a_\lambda\},\{a_\lambda r_t\}>$, which is a tuple of the concealed information $\{a_\lambda\}$ and the concealed information $\{a_\lambda r_t\}$, and updating $C_1$, by appending the randomized distributed value $<a_\lambda>$, and upon obtaining concealed information $\{h_w\}$, which is a secure computation result in accordance with the secret sharing method meth, obtaining concealed information $\{h_w r_t\}$ by secure computation using the concealed information $\{h_w\}$ and the concealed information $\{r_t\}$, obtaining a randomized distributed value $<h_w>=<\{h_w\}, \{h_w r_t\}>$, which is a tuple of the concealed information $\{h_w\}$ and the concealed information $\{h_w r_t\}$, and updating $C_{1, t}$ by appending the randomized distributed value $<h_w>$, thus updating the first checksum including $C_{1, t}$ and (2) processing for generating the second checksum in accordance with the second scheme includes (2-1) processing for obtaining concealed information $\{A|D\}=\{A|D_0| \ldots |D_{Y-1}\}$ by concatenating concealed information $\{A\}$ of a non-randomized sequence $A \in F^{UB}$ formed from members of matrices $M_{0, \gamma, \mu}, \ldots, M_{B-1, \gamma, \mu}$ and concealed information $\{D_0\}, \ldots, \{D_{Y-1}\}$ of Y dummy blocks $D_0, \ldots, D_{Y-1} \in F^U$, (2-2) processing for obtaining, by secure computation, concealed information $\{\Pi_q\}=\{\pi_q(A|D)\}$ of a randomized sequence $\Pi_q=\pi_q(A|D) \in F^{U(B+Y)}$ which is obtained by random permutation of A|D using the concealed information $\{A|D\}$, and (2-3) processing for executing, using the concealed information $\{A\}$, secure computations of sub-processes $Sub_0, \ldots, Sub_{\Theta-1}$ for each piece of the concealed information $\{M_{b, \gamma, \mu}\}$ corresponding to U members of the matrix $M_{b, \gamma, \mu}$ forming the non-randomized sequence A, thereby obtaining the concealed information $\{M_{b, \Gamma, MU}\}$ of the matrix $M_{b, \Gamma, MU}$, which is obtained by application of the remaining process to the members of the matrix $M_{b, \gamma, \mu}$ forming the non-randomized sequence A, and updating $C_{2, A}$ with a secure computation result of each sub-process $Sub_\Theta$ generated in a course of obtaining the concealed information $\{M_{b, \Gamma, MU}\}$ updating $C_{2, \Pi\_q}$ with the secure computation result of each sub-process $Sub_\Theta$, which is obtained by execution of the secure computations of the sub-processes $Sub_0, \ldots, Sub_{\Theta-1}$ for each piece of concealed information corresponding to U members forming the randomized sequence $\Pi_q$ using the concealed information $\{\Pi_q\}$, and updating $C_{2, D}$ with concealed information of an operation result of each sub-process $Sub_\Theta$, which is obtained by executing the sub-processes $Sub_0, \ldots, Sub_{\Theta-1}$ on at least some of dummy blocks $D_y$, thus updating the second checksum including $C_{2, A}$, $C_{2, \Pi\_q}$, and $C_{2, D}$.

4. The secure computation device according to claim 3, wherein the round processing unit further performs a dummy later-stage process for obtaining concealed information of a processing result obtained by performing the remaining process on a to-be-processed dummy block DP which is any one of the dummy blocks $D_0, \ldots, D_{Y-1}$, using concealed information of any one of round keys $k_2, \ldots, k_{R+1}$ and concealed information $\{DP\}$ of the to-be-processed dummy block DP, and generates a third checksum for detecting falsification in the dummy later-stage process in accordance with a third scheme, and the third scheme is a scheme in which level of security does not depend on the amount of data of a reconstructed value of concealed information for which falsification is to be detected.

5. The secure computation device according to claim 4, wherein (3) processing for generating the third checksum in accordance with the third scheme includes processing for, when performing secure computation that uses concealed information $\{d_\lambda\}$ in accordance with the secret sharing method $meth_t$, obtaining concealed information $\{d_\lambda r_t\}$ by secure computation using the concealed information $\{d_\lambda\}$ and the concealed information $\{r_t\}$, obtaining a randomized distributed value $<d_\lambda>=<\{d_{80} r_t\}>$, which is a tuple of the concealed information $\{d_\lambda\}$ and the concealed information $\{d_\lambda r_t\}$, and updating $C_{3, t}$ by appending the randomized distributed value $<d_\lambda>$, and upon obtaining concealed information $\{h'_w\}$, which is a secure computation result in accordance with the secret sharing method $meth_t$, obtaining concealed information $\{h'_w r_t\}$ by secure computation using the concealed information $\{h'_w\}$ and the concealed information $\{r_t\}$, obtaining a randomized distributed value $<h'_w>=<\{h'_w\}, \{h'_w r_t\}>$, which is a tuple of the concealed information $\{h'_w\}$ and the concealed information $\{h'_w r_t\}$, and updating $C_{3, t}$ by appending the randomized distributed value $<h'_w>$, thus updating the third checksum including $C_{3, t}$.

6. The secure computation device according to claim 3 or according to claim 4 or according to claim 5, wherein p is a prime number greater than B, and $Y=p-B$ holds.

7. The secure computation device according to claim 3 or according to claim 4 or according to claim 5, wherein the random permutation is random cyclic shift.

8. The secure computation device according to claim 1 or according to claim 2 or according to claim 3 or according to claim 4 or according to claim 5, wherein the matrix $M_{b, \gamma, \mu}$ is $M_{b, 3, 1}$ or $M_{b, 3, 2}$.

9. A secure computation method implemented by a secure computation device among a plurality of secure computation devices performing secure computation for a block cipher, wherein B is an integer equal to or greater than 1, R is an integer equal to or greater than 3, S is an integer equal to or greater than 2, $U=S^2$ holds, F is a field, $b=0, \ldots, B-1$ holds, $r=1, \ldots, R$ holds, and $j=2, \ldots, R$ holds, the secure computation device performs, in cooperation and in communication over a network with the remaining of the plurality of secure computation devices, round processing in a first round includes a process $P_{1, 4}$, the process $P_{1, 4}$ including processing for obtaining a matrix $M_{b, 1, 4}$ by adding S counter values $i_{b, 0}, \ldots, i_{b, S-1}$ to S members in one of columns of an S×S matrix that is formed from members of a round key $k_1 \in F^U$ of the first round, respectively, round processing in a jth round includes a process $P_{j, 1}$, a process $P_{j, 2}$, a process $P_{j, 3}$, and a process $P_{j, 4}$, the process $P_{j, 1}$ including processing for obtaining a matrix $M_{b, j, 1}$ by permutation of members of a matrix $M_{b, j-1, 4}$, the process $P_{j, 2}$ including processing for obtaining a matrix $M_{b, j, 2}$ by cyclically shifting members of the matrix $M_{b, j, 1}$ on a per-row basis, the process $P_{j, 3}$ including processing for obtaining a matrix $M_{b, j, 3}$ which has linear sums of S members of each column of the matrix $M_{b, j, 2}$ as the S members of that column, and the process $P_{j, 4}$ including processing for obtaining a matrix $M_{b, j, 4}$ by adding the respective members of a round key $k_j$ of the jth round to the respective members of the matrix $M_{b, j, 3}$, and the secure computation method includes
  receiving concealed information $\{P_b\}$ of plaintext block $P_b$, which is a divided share such that each of the plurality of secure computation devices receive a different share of concealed information $\{P_b\}$ from among concealed information concealed information $\{P_0\}, \ldots, \{P_{B-1}\}$ that is generated based on dividing plaintext P for encryption into plaintext blocks $P_0, \ldots, P_{B-1}$ and performing secret sharing such that the plaintext block P is concealed from each of the plurality of secure computation devices
  a table generation step in which a table generation unit performs an early-stage process for obtaining concealed information $\{M(i_0, \ldots, i_{S-1})\}$ of a table $M(i_0, \ldots, i_{S-1})$ having one-variable function values for a variable $i=i_0, \ldots, i_{S-1}$ as its members, by secure computation using concealed information of any one of round keys $k_1, \ldots, k_3$,
  a table calculation step in which a table calculation unit obtains concealed information $\{M_{b, \gamma, \mu}\}$ of a matrix $M_{b, \gamma, \mu}$ for $b=0, \ldots B-1$ by secure computation using concealed information $\{i_{b, 0}\}, \ldots, \{i_{b, S-1}\}$ of the counter values $i_{b, 0}, \ldots, i_{b, S-1}$ and the concealed information $\{M(i_0, \ldots, i_{S-1})\}$, where $M(i_{b, 0}, \ldots i_{b, S-1})$ generated by substituting the counter values $i_{b, 0}, \ldots, i_{b, S-1}$ into the table $M(i_0, \ldots, i_{S-1})$ represents the matrix $M_{b, \gamma, \mu}$, which is any one of the matrix $M_{b, 2, 1}, M_{b, 2, 2}, M_{b, 2, 3}, M_{b, 2, 4}, M_{b, 3, 1}$, or $\ldots, M_{b, 3, 2}$,
  a round processing step in which a round processing unit performs a later-stage process for obtaining concealed information $\{M_{b, \Gamma, MU}\}$ of a matrix $M_{b, \Gamma, MU}$ which is obtained by execution of a remaining process, by secure computation using concealed information of any one of round keys $k_2, \ldots, k_{R+1}$ and the concealed information $\{M_{b, \gamma, \mu}\}$, where the remaining process includes those processes among the process $P_{j, 1}$, the process $P_{j, 2}$, the process $P_{j, 3}$, and the process $P_{j, 4}$ for $j=2, \ldots, R$ that are performed subsequent to a process $P_{\gamma, \mu}$, and
  an addition step that includes obtaining concealed information $\{C_b\}$ of $C_b = M_{b, R+1, 4} + P_b$ by secure computation using the obtained concealed information $\{M_{b, \Gamma, MU}\}$ of a matrix $M_{b, \Gamma, MU}$ and the received concealed information $\{P_b\}$ and outputting the concealed information $\{C_b\}$ of $C_b = M_{b, R+1, 4} + P_b$, wherein all of the plurality of secure computation devices output different shares of concealed information $\{C_b\}$ of $C_b = M_{b, R+1}P_b$ which can be reconstructed externally to the plurality of secure computation devices to obtain the plaintext data P.

10. A computer-readable recording medium storing a program for causing a computer to function as the secure computation device among a plurality of secure computation devices performing secure computation for a block cipher, wherein
  B is an integer equal to or greater than 1, R is an integer equal to or greater than 3, S is an integer equal to or greater than 2, $U=S^2$ holds, F is a finite field, $b=0, \ldots, B-1$ holds, $r=1, \ldots, R$ holds, and $j=2, \ldots, R$ holds,
  the secure computation device is configured to perform, in cooperation and in communication over a network with the remaining of the plurality of secure computation devices,
    round processing in a first round includes a process $P_{1, 4}$, the process $P_{1, 4}$ including processing for obtaining a matrix $M_{b, 1, 4}$ by adding S counter values $i_{b, 0}, \ldots, i_{b, S-1}$ to S members in one of columns of an S×S matrix that is formed from members of a round key $k_1 \in F^U$ of the first round, respectively,
    round processing in a jth round includes a process $P_{j, 1}$, a process $P_{j, 2}$, a process $P_{j, 3}$, and a process $P_{j, 4}$, the process $P_{j, 1}$ including processing for obtaining a matrix $M_{b, j, 1}$ by permutation of members of a matrix $M_{b, j-1, 4}$, the process $P_{j, 2}$ including processing for obtaining a matrix $M_{b, j, 2}$ by cyclically shifting members of the matrix $M_{b, j, 1}$ on a per-row basis, the process $P_{j, 3}$ including processing for obtaining a matrix $M_{b, j, 3}$ which has linear sums of S members of each column of the matrix $M_{b, j, 2}$ as the S members of that column, and the process $P_{j, 4}$ including processing for obtaining a matrix $M_{b, j, 4}$ by adding the respective members of a round key $k_j$ of the jth round to the respective members of the matrix $M_{b, 1, 3}$, and
  the secure computation device includes processing circuitry configured to
    receive concealed information $\{P_b\}$ of plaintext block $P_b$, which is a divided share such that each of the plurality of secure computation devices receive a different share of concealed information $\{P_b\}$ from among concealed information concealed information $\{P_0\}, \ldots, \{P_{B-1}\}$ that is generated based on dividing plaintext P for encryption into plaintext blocks $P_0, \ldots, P_{B-1}$ and performing secret sharing such that the plaintext block P is concealed from each of the plurality of secure computation devices,
  the processing circuitry being further configured to implement:
    a table generation unit that performs an early-stage process of obtaining concealed information $\{M(i_0, \ldots, i_{S-1})\}$ of a table $M(i_0, \ldots, i_{S-1})$ having one-variable function values for a variable $i=i_0, \ldots, i_{S-1}$ as its members, by secure computation using concealed information of any one of round keys $k_1, \ldots, k_3$,
    a table calculation unit that obtains concealed information $\{M_{b, \gamma, \mu}\}$ of a matrix $M_{b, \gamma, \mu}$ for $b=0, \ldots, B-1$ by secure computation using concealed information $\{i_{b, 0}\} \ldots, \{i_{b, S-1}\}$ of the counter values $i_{b, 0}, \ldots, i_{b, S-1}$ and the concealed information $\{M(i_0, \ldots, i_{S-1})\}$, where $M(i_{b, 0}, \ldots, i_{b, S-1})$ generated by substituting the counter values $i_{b, 0}, \ldots, i_{b, S-1}$ into the table $M(i_0, \ldots, i_{S-1})$ represents the matrix $M_{b, \gamma, \mu}$, which is any one of the matrix $M_{b, 2, 1}, M_{b, 2, 2}, M_{b, 2, 3}, M_{b, 2, 4}, M_{b, 3, 1}$, or $\ldots, M_{b, 3, 2}$,
    a round processing unit that performs a later-state process for obtaining concealed information $\{M_{b, \Gamma, MU}\}$ of a mtrix $M_{b, \Gamma, MU}$ which is obtained by execution of a remaining process, by secure computation using concealed information of any one of round keys $k_2, \ldots, k_{R+1}$ and the concealed information $\{M_{b, \gamma, \mu}\}$, where the remaining process includes those processes among the process $P_{j, 1}$, the process $P_{j, 2}$, the process $P_{j, 3}$, and the process $P_{j, 4}$ for $j=2, \ldots, R$ that are performed subsequent to a process $P_{\gamma, \mu}$, and
    an addition unit that performs an addition process for obtaining concealed information $\{C_b\}$ of $C_b = M_{b, R+1, 4} + P_b$ by secure computation using the obtained concealed information $\{M_{b, \Gamma, MU}\}$ of a matrix $M_{b, \Gamma, MU}$ and the received concealed information $\{P_b\}$ and outputting the concealed information $\{B_b\}$ of $C_b=M_{b,\ R+1,\ 4}+P_b$, wherein all of the plurality of secure computation devices output different shares of concealed information $\{C_b\}$ of $C_b=M_{b,\ R+1,\ 4}+P_b$ which can be reconstructed externally to the plurality of secure computation devices to obtain the plaintext data P.

11. A non-transitory computer-readable recording medium storing a program for causing a computer to function as the secure computation device among a plurality of secure computation devices performing secure computation for a block cipher, wherein B is an integer equal to or greater than 1, R is an integer equal to or greater than 3, S is an integer equal to or greater than 2, $U=S^2$ holds, F is a finite field, $b=0, \ldots, B-1$ holds, $r=1, \ldots, R$ holds, and $j=2, \ldots, R$ holds, the secure computation device is configured to perform, in cooperation and in communication over a network with the remaining of the plurality of secure computation devices, round processing in a jth round includes a process $P_{j,\ 1}$, a process $P_{j,\ 2}$, a process $P_{j,\ 3}$, and a process $P_{j,\ 4}$, the process $P_{j,\ 1}$ including processing for obtaining a matrix $M_{b,j,\ 1}$ by permutation of members of a matrix $M_{b,\ j-1,\ 4}$, the process $P_{j,\ 2}$ including processing for obtaining a matrix $M_{b,\ j,\ 2}$ by cyclically shifting members of the matrix $M_{b,j,\ 1}$ on a per-row basis, the process $P_{j,\ 3}$ including processing for obtaining a matrix $M_{b,\ j,\ 3}$ which has linear sums of S members of each column of the matrix $M_{b,\ j,\ 2}$ as the S members of that column, and the process $P_{j,\ 4}$ including processing for obtaining a matrix $M_{b,\ j,\ 4}$ by adding the respective members of a round key $k_j$ of the jth round to the respective members of the matrix $M_{b,\ j,\ 3}$, and the secure computation device includes processing circuitry configured to receive concealed information $\{P_b\}$ of plaintext block $P_b$, which is a divided share such that each of the plurality of secure computation devices receive a different share of concealed information $\{P_b\}$ from among concealed information concealed information $\{P_0\}, \ldots, \{P_{B-1}\}$ that is generated based on dividing plaintext P for encryption into plaintext blocks $P_0, \ldots, P_{B-1}$ and performing secret sharing such that the plaintext block P is concealed from each of the plurality of secure computation devices, the processing circuitry being further configured to implement:

a table generation unit that performs an early-stage process for obtaining concealed information $\{M(i_0, \ldots, i_{S-1})\}$ of a table $M(i_0, \ldots, i_{S-1})$ having one-variable function values for a variable $i=i_0, \ldots, i_{S-1}$ as its members, by secure computation using concealed information of any one of round keys $k_1, \ldots, k_3$, a table calculation unit that obtains concealed information $\{M_{b,\ \gamma,\ \mu}\}$ of a matrix $M_{b,\ \gamma,\ \mu}$ for $b=0, \ldots, B-1$ by secure computation using concealed information $\{i_{b,\ 0}\}, \ldots, \{i_{b,\ S-1}\}$ of the counter values $i_{b,\ 0}, \ldots, i_{b,\ S-1}$ and the concealed information $\{M(i_0, \ldots, i_{S-1})\}$, where $M(i_{b,\ 0}, \ldots, i_{b,\ S-1})$ generated by substituting the counter values $i_{b,\ 0}, \ldots, i_{b,\ S-1}$ into the table $M(i_0, \ldots, i_{S-1})$ represents the matrix $M_{b,\ \gamma,\ \mu}$, which is any one of the matrix $M_{b,\ 2,\ 1}, M_{b,\ 2,\ 2}, M_{b,\ 2,\ 3}, M_{b,\ 2,\ 4}, M_{b,\ 3,\ 1}$, or $\ldots, M_{b,\ 3,\ 2}$, a round processing unit that performs a later-stage process for obtaining concealed information $\{M_{b,\ \Gamma,\ MU}\}$ of a matrix $M_{b,\ \Gamma,\ MU}$ which is obtained by execution of a remaining process, by secure computation using concealed information of any one of round keys $k_2, \ldots, k_{R+1}$ and the concealed information $\{M_{b,\ \gamma,\ \mu}\}$, where the remaining process includes those processes among the process $P_{j,\ 1}$, the process $P_{j,\ 2}$, the process $P_{j,\ 3}$, and the process $P_{j,\ 4}$ for $j=2, \ldots, R$ that are performed subsequent to a process $P_{\gamma,\ \mu}$, and an addition unit that performs an addition process for obtaining concealed information $\{C_b\}$ of $C_b = M_{b,\ R+1,\ 4}+P_b$ by secure computation using the obtained concealed information $\{M_{b,\ \Gamma,\ MU}\}$ of a matrix $M_{b,\ \Gamma,\ MU}$ and the received concealed information $\{P_b\}$ and outputting the concealed information $\{C_b\}$ of $C_b=M_{b,\ R+1,\ 4}+P_b$, wherein all of the plurality of secure computation devices output different shares of concealed information $\{C_b\}$ of $C_b=M_{b,\ R+1},\ \mathbf{4}+P_b$ which can be reconstructed externally to the plurality of secure computation devices to obtain the plaintext data P, wherein the table generation unit generates a first checksum for detecting falsification in the early-state process in accordance with a first scheme, the round processing unit generates a second checksum for detecting falsification in the later-stage process in accordance with a second scheme, the first scheme is a scheme in which level of security does not depend on an amount of data of a reconstructed value of concealed information for which falsification is to be detected, and the second scheme is a scheme in which security when the amount of data of a reconstructed value of concealed information for which falsification is to be detected is $\alpha_1$ is higher than security when the amount of data of a reconstructed value of concealed information for which falsification is to be detected is $\alpha_2$, where $\alpha_1$ is greater than $\alpha_2$.

12. A secure computation method implemented by a secure computation device among a plurality of secure computation devices performing secure computation for a block cipher, wherein B is an integer equal to or greater than 1, R is an integer equal to or greater than 3, S is an integer equal to or greater than 2, $U=S^2$ holds, F is a field, $b=0, \ldots, B-1$ holds, $r=1, \ldots, R$ holds, and $j=2, \ldots, R$ holds, the secure computation device performs, in cooperation and in communication over a network with the remaining of the plurality of secure computation devices, round processing in a first round includes a process $P_{1,\ 4}$, the process $P_{1,\ 4}$ including processing for obtaining a matrix $M_{b,\ 1,\ 4}$ by adding S counter values $i_{b,\ 0}, \ldots, i_{b,\ S-1}$ to S members in one of columns of an S×S matrix that is formed from members of a round key $k_1 \in F^U$ of the first round, respectively, round processing in a jth round includes a process $P_{j,\ 1}$, a process $P_{j,\ 2}$, a process $P_{j,\ 3}$, and a process $P_{j,\ 4}$, the process $P_{j,\ 1}$ including processing for obtaining a matrix $M_{b,j,\ 1}$ by permutation of members of a matrix $M_{b,\ j-1,\ 4}$, the process $P_{j,\ 2}$ including processing for obtaining a matrix $M_{b,\ j,\ 2}$ by cyclically shifting members of the matrix $M_{b, j, 1}$ on a per-row basis, the process $P_{j, 3}$ including processing for obtaining a matrix $M_{b, j, 3}$ which has linear sums of S members of each column of the matrix $M_{b, j, 2}$ as the S members of that column, and the process $P_{j, 4}$ including processing for obtaining a matrix $M_{b, j, 4}$ by adding the respective members of a round key $k_j$ of the jth round to the respective members of the matrix $M_{b, j, 3}$, and the secure computation method includes
  receiving concealed information $\{P_b\}$ of plaintext block $P_b$, which is a divided share such that each of the plurality of secure computation devices receve a different share of concealed information $\{P_b\}$ from among concealed information concealed information $\{P_0\}, \ldots, \{P_{B-1}\}$ that is generated based on dividing plaintext P for encryption into plaintext blocks $P_0, \ldots, P_{B-1}$ and performing secret sharing such that the plaintext block P is concealed from each of the plurality of secure computation devices,
  a table generation step in which a table generated unit performs an early-stage process for obtaining concealed information $\{M(i_0, \ldots, i_{S-1})\}$ of a table $M(i_0, \ldots, i_{S-1})$ having one-variable function values for a variable $i=i_0, \ldots, i_{S-1}$ as its members, by secure computation using concealed information of any one of round keys $k_1, \ldots, k_3$,
  a table calculation step in which a table calculation unit obtains concealed information $\{M_{b, \gamma, \mu}\}$ of a matrix $M_{b, \gamma, \mu}$ for $b=0, \ldots, B-1$ by secure computation using concealed information $\{i_{b, 0}\}, \ldots, \{i_{b, S-1}\}$ of the counter values $i_{b, 0}, \ldots, i_{b, S-1}$ and the concealed information $\{M(i_0, \ldots, i_{S-1})\}$, where $M(i_{b, 0}, \ldots, i_{b, S-1})$ generated by substituting the counter values $i_{b, 0}, \ldots, i_{b, S-1}$ into the table $M(i_0, \ldots, i_{S-1})$ represents the matrix $M_{b, \gamma, \mu}$, which is any one of the matrix $M_{b, 2, 1}$, $M_{b, 2, 2}$, $M_{b, 2, 3}$, $M_{b, 2, 4}$, $M_{b, 3, 1}$, or $\ldots$, $M_{b, 3, 2}$,
  a round processing step in which a round processing unit performs a later-stage process for obtaining concealed information $\{M_{b, \Gamma, MU}\}$ of a matrix $M_{b, \Gamma, MU}$ which is obtained by execution of a remaining process, by secure computation using concealed information of any one of round keys $k_2, \ldots, k_{R+1}$ and the concealed information $\{M_{b, \gamma, \mu}\}$ where the remaining process includes those processes among the process $P_{j, 1}$, the process $P_{j, 2}$, the process $P_{j, 3}$, and the process $P_{j, 4}$ for $j=2, \ldots, R$ that are performed subsequent to a process $P_{\gamma, \mu}$, and
  an addition step that includes obtaining concealed information $\{C_b\}$ of $C_b=M_{b, R+1, 4}+P_b$ by secure computation using the obtained concealed information $\{M_{b, \Gamma, MU}\}$ of a matrix $M_{b, \Gamma, MU}$ and the received concealed information $\{P_b\}$ and outputting the concealed information $\{C_b\}$ of $C_b=M_{b, R+1, 4}+P_b$, wherein all of the plurality of secure computation devices output different shares of concealed information $\{C_b\}$ of $C_b=M_{b, R+1, 4}+P_b$ which can be reconstructed externally to the plurality of secure computation devices to obtain the plaintext data P,
wherein
  the table generation step generates a first checksum for detecting falsification in the early-state process in accordance with a first scheme,
  the round processing step generates a second checksum for detecting falsification in the later-stage process in accordance with a second scheme,
  the first scheme is a scheme in which level of security does not depend on an amount of data of a reconstructed value of concealed information for which falsification is to be detected, and
  the second scheme is a scheme in which security when the amount of data of a reconstructed value of concealed information for which falsification is to be detected is $\alpha_1$ is higher than security when the amount of data of a reconstructed value of concealed information for which falsification is to be detected is $\alpha_2$, where $\alpha_1$ is greater than $\alpha_2$.

* * * * *